United States Patent
Sugino

(10) Patent No.: US 12,403,731 B2
(45) Date of Patent: Sep. 2, 2025

(54) TIRE VALVE

(71) Applicant: PACIFIC INDUSTRIAL CO., LTD., Ogaki (JP)

(72) Inventor: Takumi Sugino, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 17/910,618

(22) PCT Filed: Sep. 15, 2021

(86) PCT No.: PCT/JP2021/033924
§ 371 (c)(1),
(2) Date: Sep. 9, 2022

(87) PCT Pub. No.: WO2023/042298
PCT Pub. Date: Mar. 23, 2023

(65) Prior Publication Data
US 2024/0198740 A1 Jun. 20, 2024

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC ............ B60C 23/0494; B60C 23/0486; B60C 23/0488; B60C 23/20; B60C 29/02; F16B 33/004; F16B 37/00; F16B 43/001
See application file for complete search history.

(56) References Cited

U.S. PATENT DOCUMENTS

| | | | |
|---|---|---|---|
| 5,393,182 A | 2/1995 | Berecz | |
| 9,086,089 B2* | 7/2015 | Stahl | ....................... F16B 39/28 |

(Continued)

FOREIGN PATENT DOCUMENTS

| | | |
|---|---|---|
| CN | 101638040 A | 2/2010 |
| CN | 102259566 A | 11/2011 |

(Continued)

OTHER PUBLICATIONS

Oct. 6, 2023 Search Report issued in European Patent Application No. 21928343.9.

(Continued)

*Primary Examiner* — Patrick C Williams
(74) *Attorney, Agent, or Firm* — Oliff PLC

(57) ABSTRACT

A tire valve includes: a valve stem passed through a valve mount hole of a rim and screwed with a nut, a retaining part extending sideways from a proximal end of the valve stem, an electronic device having a connection part that fits onto an outer side of the retaining part, a support ring set on the valve stem, the support ring and a portion of the connection part being sandwiched between the retaining part and an opening edge of the valve mount hole by fastening the nut, and an interference avoidance part formed by cutting off part of an outer circumferential surface of the support ring. The support ring and electronic device include guide parts which slide on each other by fastening the nut thereby causing the support ring and electronic device to approach to guide the support ring and electronic device toward the normal rotational position.

20 Claims, 19 Drawing Sheets

(56) References Cited

U.S. PATENT DOCUMENTS

| | | | |
|---|---|---|---|
| 9,132,704 B2* | 9/2015 | Wilson | B60C 23/00354 |
| 9,925,835 B1 | 3/2018 | Stech et al. | |
| 2004/0119584 A1 | 6/2004 | Kayukawa | |
| 2004/0182490 A1 | 9/2004 | Saheki | |
| 2006/0179929 A1* | 8/2006 | Becker | B60C 23/00363 |
| | | | 73/146 |
| 2010/0024539 A1 | 2/2010 | Hamm et al. | |
| 2010/0064791 A1 | 3/2010 | Chuang et al. | |
| 2016/0096404 A1 | 4/2016 | Gorenzweig et al. | |
| 2019/0135055 A1 | 5/2019 | Ebinuma et al. | |
| 2021/0031572 A1 | 2/2021 | Mcclurg et al. | |
| 2021/0239558 A1 | 8/2021 | Storrie | |

FOREIGN PATENT DOCUMENTS

| | | | |
|---|---|---|---|
| CN | 105480028 A | 4/2016 | |
| CN | 108859622 A | 11/2018 | |
| EP | 1340630 A1 | 9/2003 | |
| JP | 2004-203151 A | 7/2004 | |
| JP | 2004-276799 A | 10/2004 | |
| JP | 2008-143344 A | 6/2008 | |
| JP | 2012-091568 A | 5/2012 | |
| JP | 2014-113854 A | 6/2014 | |
| WO | 2017/032504 A1 | 3/2017 | |
| WO | 2020/114792 A1 | 6/2020 | |
| WO | 2022/249264 A1 | 12/2022 | |

OTHER PUBLICATIONS

Oct. 18, 2023 Office Action issued in European Patent Application No. 21928343.9.
Nov. 16, 2021 Search Report issued in International Patent Application No. PCT/JP2021/033924.
Mar. 28, 2024 Office Action issued in Chinese Patent Application No. 202180019155.8.
Apr. 30, 2024 Office Action issued in Korean Patent Application No. 10-2022-7030259.

* cited by examiner

TIRE VALVE

TECHNICAL FIELD

The present disclosure relates to a tire valve inserted into a valve mount hole extending through the rim of a tire wheel from an inner side of the rim, and screwed with a nut on an outer side.

BACKGROUND ART

Tire valves of this type, with an electronic device attached to a proximal end of a valve stem, are commonly known (see, for example, Patent Document 1).

RELATED ART DOCUMENTS

Patent Documents

Patent Document 1: JP 2004-276799 A (FIG. 2 and paragraph)

SUMMARY OF THE INVENTION

Problem to be Solved by the Invention

The above tire valve is desired to be mounted such that the electronic device is disposed in a predetermined normal rotational position around the valve mount hole relative to the tire wheel in consideration of centrifugal force, and the operation of attaching the tire valve to a tire wheel in this way required deft skills. Accordingly, the present disclosure proposes a technique that can facilitate the operation of attaching a tire valve such that an electronic device is set in a normal rotational position relative to a tire wheel.

Means of Solving the Problem

A tire valve according to a first aspect of the present disclosure made to solve the above problem is a tire valve including: a valve stem passed through a valve mount hole extending through a rim of a tire wheel from an inner side of the rim and screwed with a nut on an outer side of the rim; a retaining part extending sideways from a proximal end of the valve stem; an electronic device having a connection part that fits onto an outer side of the retaining part; a support ring set on the valve stem, the support ring and a portion of the connection part being sandwiched between the retaining part and an opening edge of the valve mount hole when the nut is fastened; an interference avoidance part formed by cutting off part of an outer circumferential surface of the support ring and positioned adjacent to a wheel wall portion of the tire wheel near the valve mount hole; and guide parts provided to the support ring and the electronic device, wherein the guide parts slide on each other when the nut is fastened thereby causing the support ring and the electronic device to approach, to guide the support ring and the electronic device toward a normal rotational position where the support ring and the electronic device are at correct rotational positions relative to each other around the valve stem, when the support ring and the electronic device are displaced from the normal rotational position.

MODE FOR CARRYING OUT THE INVENTION

First Embodiment

Figure 1:
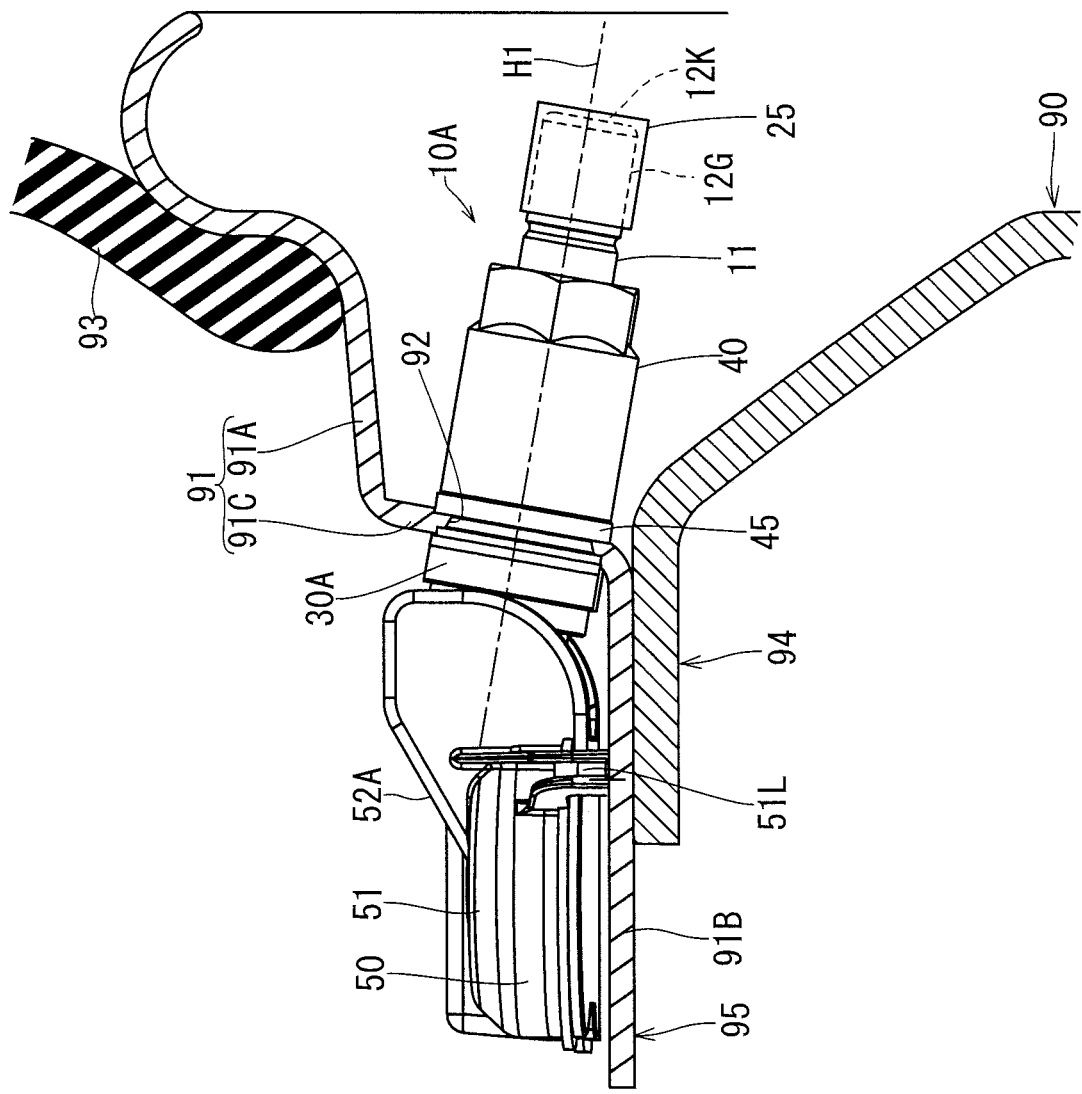
FIG. 1 is a cross-sectional view of a tire wheel with a tire valve according to a first embodiment of the present disclosure attached thereto.

Hereinafter a tire valve 10A according to a first embodiment of the present disclosure will be described with reference to FIG. 1 to FIG. 7. As shown in FIG. 1, the tire valve 10A of this embodiment is configured to include an electronic device 50 at one end of a valve stem 11, and attached to a tire wheel 90 such that the electronic device 50 is positioned inside the tire 93, with the valve stem 11 passed through a valve mount hole 92 of the tire wheel.

Figure 2:
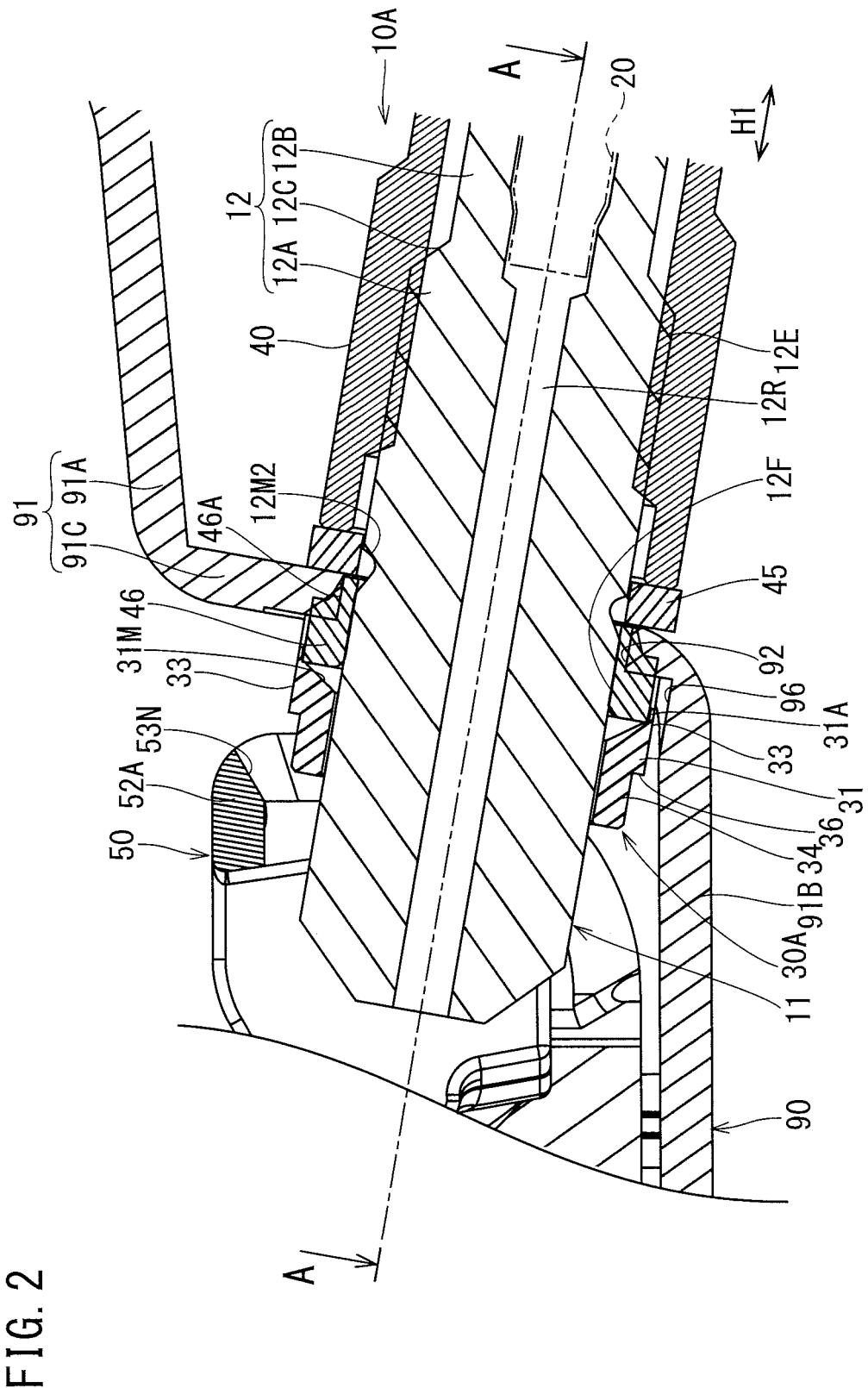
FIG. 2 is a cross-sectional side view of the tire valve seen from a second direction.

The tire wheel 90 includes a rim forming part 95, for example, on an outer side of a disc part 94. The rim forming part 95 is configured to have a tubular part 91B fitted and welded to an outer side of the disc part 94, for example, with a pair of rims 91 extending sideways from both ends of the tubular part 91B (FIG. 1 shows only one of the rims 91). The rim 91 has a tire mount part 91A at the distal end of a flange part 91C that extends from an end portion of the tubular part 91B and bends sideways. The valve mount hole 92 extends through one of the rims 91 in the flange part 91C near the tubular part 91B. The flange part 91C is slightly tilted outward. As shown in FIG. 2, a circumferential portion of the opening edge of the valve mount hole 92 is positioned in an inner corner between the flange part 91C and the tubular part 91B, and a notch 96 having a flat surface parallel to the axial direction of the valve mount hole 92, for example, is formed in this inner corner.

In this embodiment, the notch 96 in the tire wheel 90 described above corresponds to a "wheel wall portion" in the claims that is adjacent to an interference avoidance part 33 of a support ring 30A to be described later. The "wheel wall portion" adjacent to the interference avoidance part 33 may not necessarily be formed by cutting off part of the tire wheel 90 and may be, for example, a portion of the tubular part 91B that is not cut off. The tire wheel 90 may be made of iron or aluminum.

Figure 3:
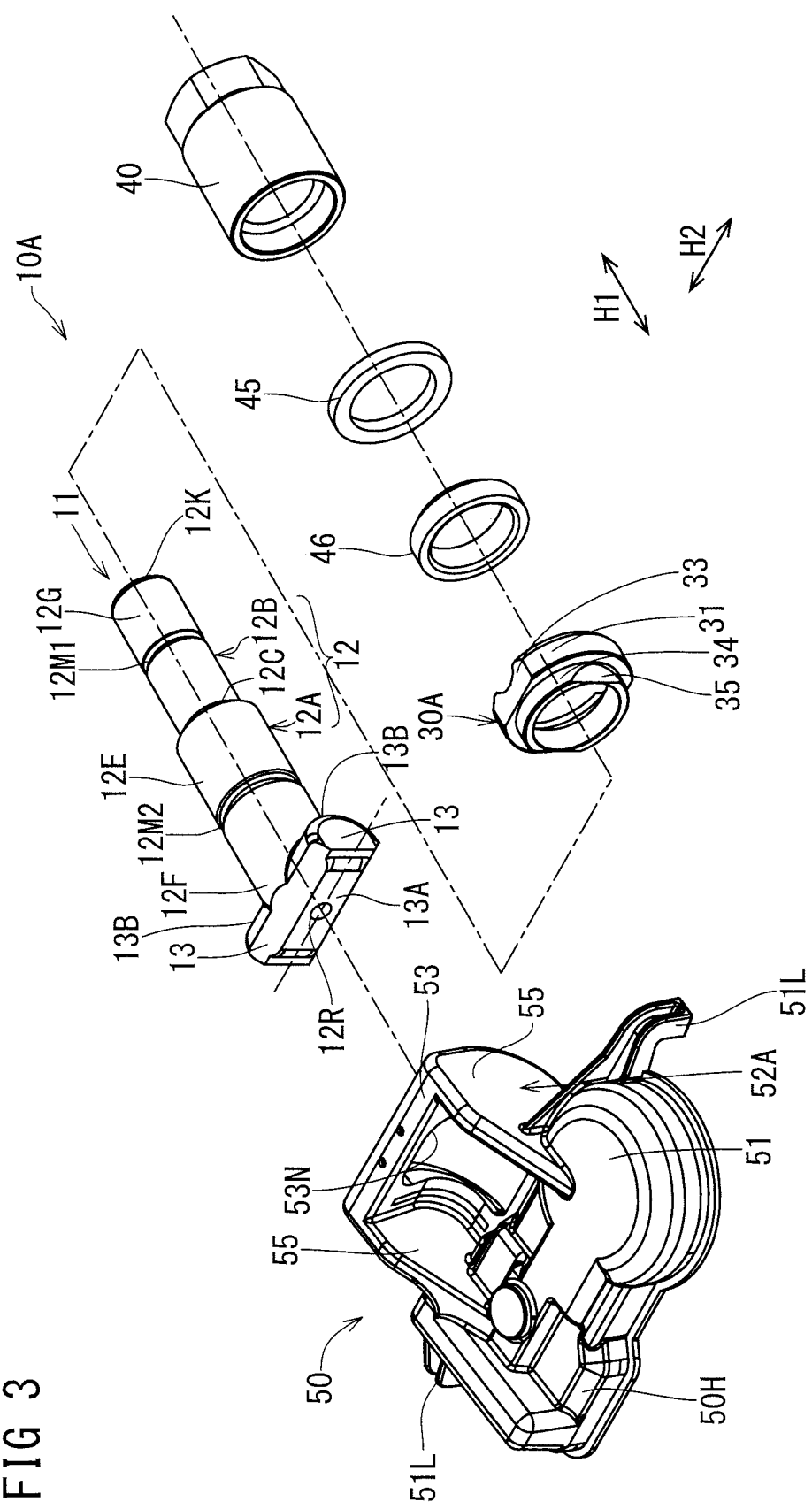
FIG. 3 is an exploded perspective view of the tire valve.

The valve stem 11 is made of metal and, as shown in FIG. 3, configured in a symmetrical shape as a whole, with a cylindrical stem body 12 and a pair of retaining parts 13 extending from one end of the stem body to both sides. The valve stem 11 may be made of resin, and/or asymmetrical. Hereinafter in the description of various parts of the tire valve 10A, the axial direction along the center axis of the stem body 12 shall be referred to as a first direction H1, and the direction in which the pair of retaining parts 13 extends shall be referred to as a second direction H2. One side in the first direction H1 where there are the retaining parts 13 shall be referred to as a "proximal side", and the opposite side as a "distal side".

As shown in FIG. 2, the stem body 12 accommodates a valve core 20 inside. The valve core 20 has a structure known as a check valve, which restricts the air from passing from the proximal side to the distal side in a flow passage 12R inside the valve stem 11, while allowing the air to pass in the opposite direction.

As shown in FIG. 3, the stem body 12 on the outside includes a large-diameter part 12A on the proximal side and a small-diameter part 12B on the distal side, with a tapered part 12C in the middle in the axial direction. The small-diameter part 12B has an annular groove 12M1 in the middle in the axial direction, the distal side from this annular groove 12M1 being a threaded part 12G. A valve cap 25 (see FIG. 1) that covers a distal end opening 12K of the stem body 12 is screwed to this threaded part 12G.

The large-diameter part 12A also has an annular groove 12M2 in the middle in the axial direction, the distal side from this annular groove 12M2 being a threaded part 12E. As shown in FIG. 2, a nut 40 for fitting the valve stem 11 to the tire wheel 90 is screwed to the threaded part 12E. The proximal side from the annular groove 12M2 of the large-diameter part 12A is a fitting part 12F, to which the support ring 30A, a grommet 46, and a washer 45 are fitted. When the tire valve 10A is attached to the rim 91, a middle portion of the fitting part 12F extends through the valve mount hole 92 of the rim 91, with the washer 45 abutted on the opening edge on the outer side of the rim 91 and the support ring 30A abutted on the opening edge on the inner side of the rim 91, and with the grommet 46 pressed into the valve mount hole 92 from the inner side of the rim 91 and making tight contact with an outer surface of the fitting part 12F and an inner surface of the valve mount hole 92. The shapes of the support ring 30A and grommet 46 will be described in more detail later.

As shown in FIG. 3, the pair of retaining parts 13 extends from the proximal end of the stem body 12 to both sides as described above. The pair of retaining parts 13 on the outside has an arcuate surface 13B that is semicircular on the side facing the distal end of the stem body 12. The pair of retaining parts 13 on the outside has a flat surface 13A continuous over the pair of retaining parts 13 on the opposite side from the arcuate surface 13B. The flow passage 12R inside the stem body 12 opens at the center in the flat surface 13A. Alternatively, the retaining parts 13 may be columnar so that it has a cylindrical outer surface as a whole.

The electronic device 50 includes, for example, a wireless circuit and a sensor that detects a condition of the tire 93, and wirelessly transmits the detection results of the sensor to a tire monitoring device in the vehicle body (not shown). The tire monitoring device monitors the presence or absence of an abnormality in the condition of the tire 93 based on the received detection results. Concrete examples of the sensor include a pressure sensor that detects internal pressure of the tire 93, a temperature sensor that detects temperature inside the tire 93, an acceleration sensor capable of detecting vibration applied to the tire wheel 90, and so on. Other sensors may be used. There may be one sensor, or a plurality of sensors.

The electronic device 50 is configured such that an electrical circuit including the sensor and wireless circuit described above is packaged in a resin-made housing 50H. The housing 50H includes a case part 51 that accommodates the electrical circuit, and a connection part 52A for coupling the electronic device 50 to the valve stem 11. The case part 51 is elongated along the second direction H2 and flat in a direction perpendicular to the second direction H2. Hereinafter the direction in which the case part 51 of the electronic device 50 is flattened shall be referred to as an up-down direction, one side being the upper side and the other side being the lower side. The direction perpendicular to both of the direction in which the case part 51 is flattened and the second direction H2 shall be referred to as a front-back direction of the electronic device 50, one side being the front side and the other side being the rear side.

Figure 5A:
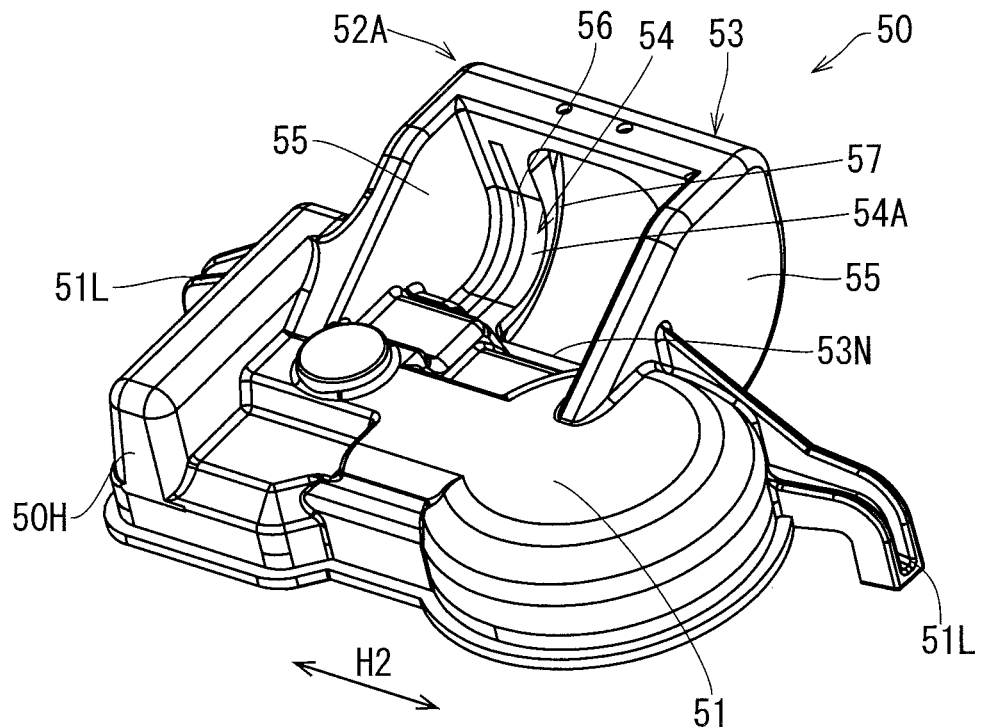
FIG. 5(A) is a perspective view of an electronic device seen from above and (B) is a perspective view of the electronic device seen from below.
Figure 5B:
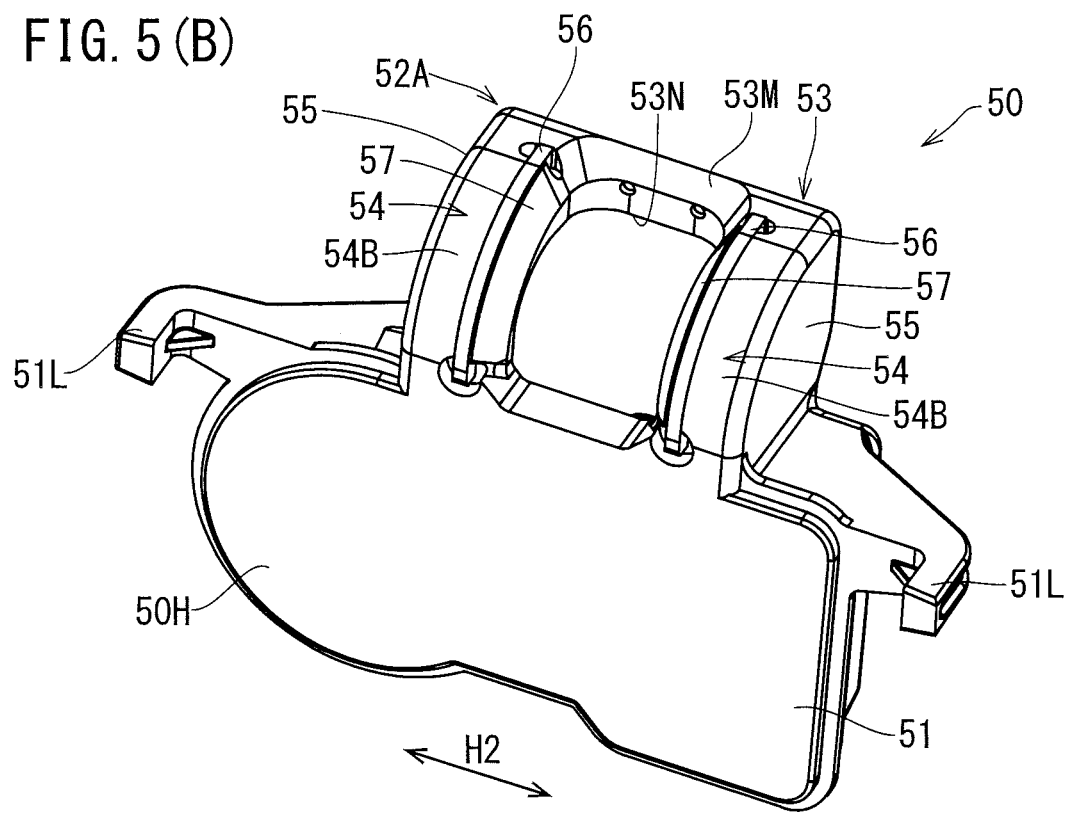

While the lower surface of the case part 51 is flat as shown in FIG. 5(B), the upper surface of the case part 51 is uneven as shown in FIG. 5(A). The connection part 52A as a whole has a trough shape with an open top, and is connected to the case part 51 on the front and upper side thereof.

To be more specific, the connection part 52A includes a curved wall 53 extending forward from a lower edge portion on the front face of the case part 51 and arcuately curved upward, and a pair of connecting walls 55 connecting both ends in the second direction H2 of the curved wall 53 with the front face and an upper front portion of the case part 51. The pair of connecting walls 55 is located near one end and the other end in the second direction H2 of the case part 51. A pair of L-shaped legs 51L extends out in the second direction H2 from the surfaces of the pair of connecting walls 55 on the opposite sides to the surfaces facing each other. The pair of L-shaped legs 51L extends from the case part 51 to points spaced away therefrom on both sides in the second direction H2, where they bend downwards, the distal ends being positioned lower than the lower surface of the case part 51. The pair of L-shaped legs 51L is also integral with the front face of the case part 51.

A slot 53N is formed at the center in the second direction H2 of the curved wall 53, extending from near the lower end to near the upper end. The stem body 12 is passed through the slot 53N, so that the pair of retaining parts 13 of the valve stem 11 fits inside a pair of arcuate grooves 54 that is part of the curved wall 53 with the slot 53N disposed therebetween.

Figure 6:
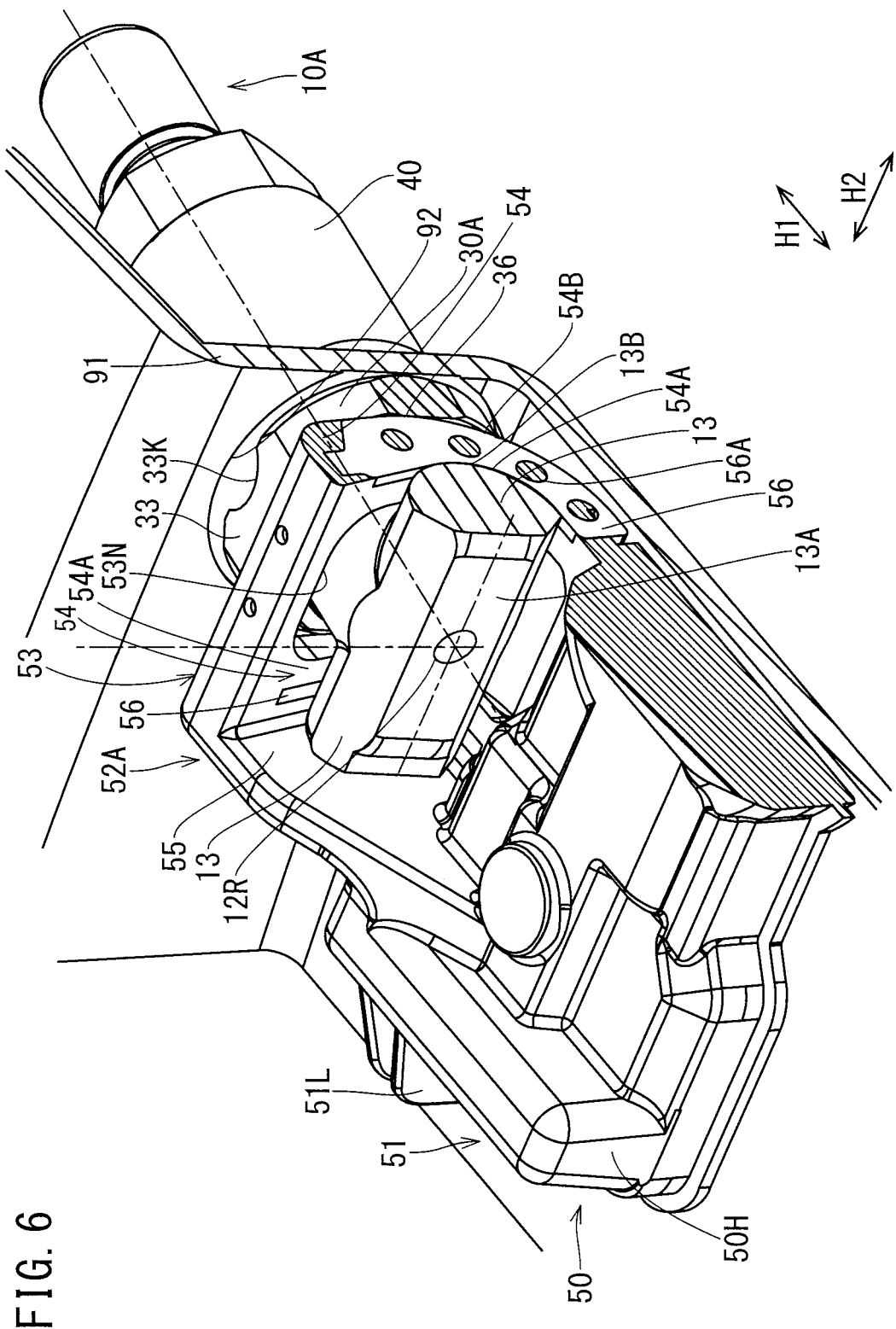
FIG. 6 is a perspective view with a cross section of the tire valve attached to a rim.

As shown in FIG. 6, the entire inner face of the pair of arcuate grooves 54 except for upper and lower ends is an inner arcuate surface 54A that is an arcuate surface having the same radius of curvature as that of the arcuate surface 13B of the pair of retaining parts 13. The entire outer face of the pair of arcuate grooves 54 except for upper and lower ends is an outer arcuate surface 54B that is an arcuate surface having the same center as that of the inner arcuate surface 54A. Moreover, as shown in FIG. 5(B), a pair of metal arcuate discs 56 is embedded in the pair of arcuate grooves 54. Each arcuate disc 56 is located near the slot 53N in each arcuate groove 54 in an arcuate shape extending from the upper end to the lower end of the arcuate groove 54, and has an inner face forming part of the inner arcuate surface 54A and an outer face forming part of the outer arcuate surface 54B. As shown in FIG. 6, the inner face of the arcuate disc 56 makes contact with the arcuate surface 13B of the retaining parts 13 as part of the inner arcuate surface 54A. A plurality of through holes 56A is formed all over the arcuate discs 56.

The pair of arcuate discs 56 is embedded in the pair of arcuate grooves 54 by insertion molding. Instead, for example, the housing 50H may be formed such as to have a pair of slits in the pair of arcuate grooves 54, and the pair of arcuate discs 56 may be inserted into the pair of slits. Alternatively, the entire curved wall 53 may be made of metal, and this metal part forming the curved wall 53 may be embedded in the housing 50H by insertion molding. Alternatively, the arcuate grooves 54 may not contain any metal parts and made only of resin (including reinforced resin reinforced with glass fiber, for example).

As shown in FIG. 5(B), a pair of opposing surfaces of the pair of arcuate grooves 54 on both sides of the slot 53N is formed with a pair of tapered guide surface 57, which corresponds to a "guide part" in the claims. To be more specific, the opening edge where the hole inner face of the slot 53N and the outer face of the curved wall 53 intersect is chamfered to a mid-point in the direction in which the slot extends through, for example. Part of this chamfered surface 53M positioned along the pair of arcuate grooves 54 serves as the pair of tapered guide surfaces 57. The pair of tapered guide surfaces 57 is sloped toward each other from the outer face to the inner face of the pair of arcuate grooves 54. The hole inner face of the slot 53N on the side closer to the inner face of the curved wall 53 from the mid-point in the direction in which the slot extends through is parallel to the radial direction of the circular arc of the inner arcuate surface 54A and outer arcuate surface 54B.

FIG. 7 shows the support ring 30A mentioned above as a single unit. The support ring 30A is made of metal, for example, its center axis being parallel to the first direction H1. As shown in FIG. 6 and as mentioned above, the support ring is fitted onto the valve stem 11 and disposed on the inner side of the rim 91. Namely, the support ring is sandwiched between the rim 91 and the connection part 52A of the electronic device 50.

Figure 7A:
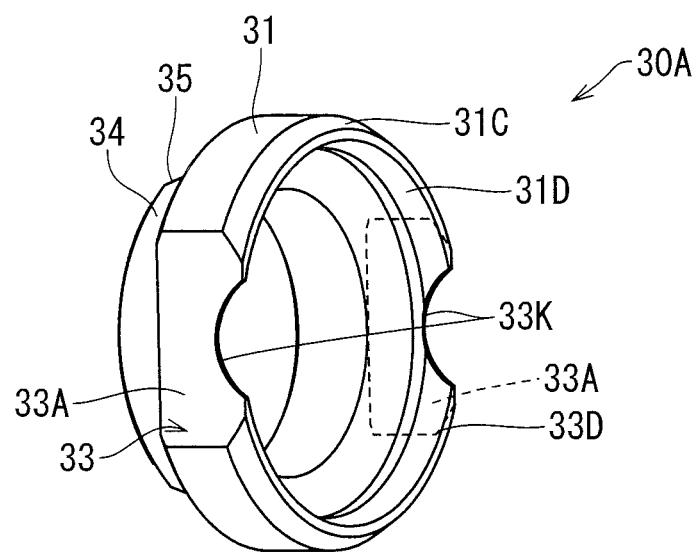
FIG. 7(A) is a perspective view of a support ring seen from a distal side, (B) is a perspective view of the support ring seen from a proximal side, and (C) is a cross-sectional side view of the support ring.
Figure 7B:
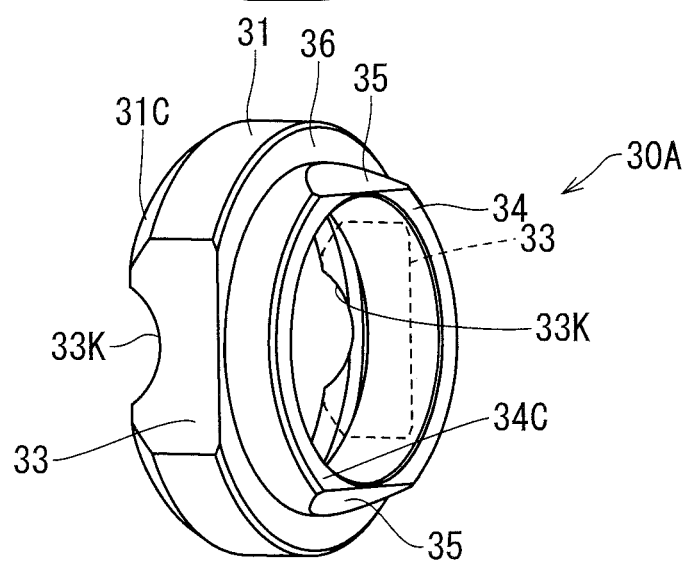
Figure 7C:
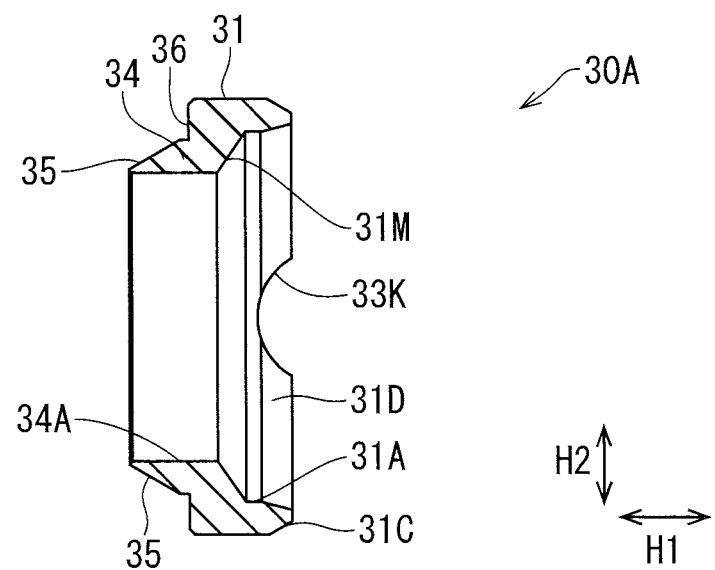

To be more specific, as shown in FIG. 7(B), the support ring 30A has a flat abutment surface 36 perpendicular to the axial direction in an axial mid-point on the outside. An outer surface of the support ring 30A on the distal end (rim 91) side of the abutment surface 36 is a large-diameter part 31, and an outer surface on the proximal end (electronic device 50) side of the abutment surface 36 is a small-diameter part 34. In an axial mid-point inside the large-diameter part 31 is a tapered surface 31M as shown in FIG. 7(C). An inner surface of the support ring 30A on the proximal end side of the tapered surface 31M is a small-diameter hole 34A, and an inner surface on the distal end side of the tapered surface 31M is a large-diameter hole 31A. Moreover, as shown in FIG. 7(A), the distal end of the support ring 30A has chamfers 31C and 31D respectively on the outer side and inner side. As shown in FIG. 7(B), the proximal end of the support ring 30A has a chamfer 34C on the outer side.

As shown in FIG. 7(A), a pair of interference avoidance parts 33 having a flat surface 33A parallel to the first direction H1 of the large-diameter part 31 is provided on the outer face of the large-diameter part 31 by cutting off two parts circumferentially spaced apart by 180°. The flat surface 33A of the pair of interference avoidance parts 33 extends in the first direction H1 over the entire large-diameter part 31, and extends in the radial direction of the large-diameter part 31 as far as to the chamfer 31D on the inner side of the large-diameter part 31, as a result of which a pair of arcuate notches 33K is formed in distal end parts of the large-diameter part 31 where the pair of interference avoidance parts 33 is formed.

As shown in FIG. 7(B), a pair of guide slopes 35, which is flat surfaces inclined to the first direction H1 of the small-diameter part 34, is formed on the outer face of the small-diameter part 34 by cutting off two parts circumferentially spaced apart by 180°. The pair of guide slopes 35 corresponds to "guide parts" in the claims, and extends from near the abutment surface 36 on the outside of the small-diameter part 34 to the distal end face of the small-diameter part 34. As shown in FIG. 4, the pair of guide slopes 35 is inclined to the first direction H1 at substantially the same angle as the angle of inclination of the pair of tapered guide surfaces 57 relative to the radial direction of the circular arc of the inner arcuate surface 54A and outer arcuate surface 54B of the electronic device 50 described above (up-down direction in FIG. 4). Moreover, as shown in FIG. 7(B), the pair of guide slopes 35 and the pair of interference avoidance parts 33 are disposed 90° out of alignment in the circumferential direction of the support ring 30A, the support ring 30A as a whole having a 180° rotation symmetry.

Figure 4:
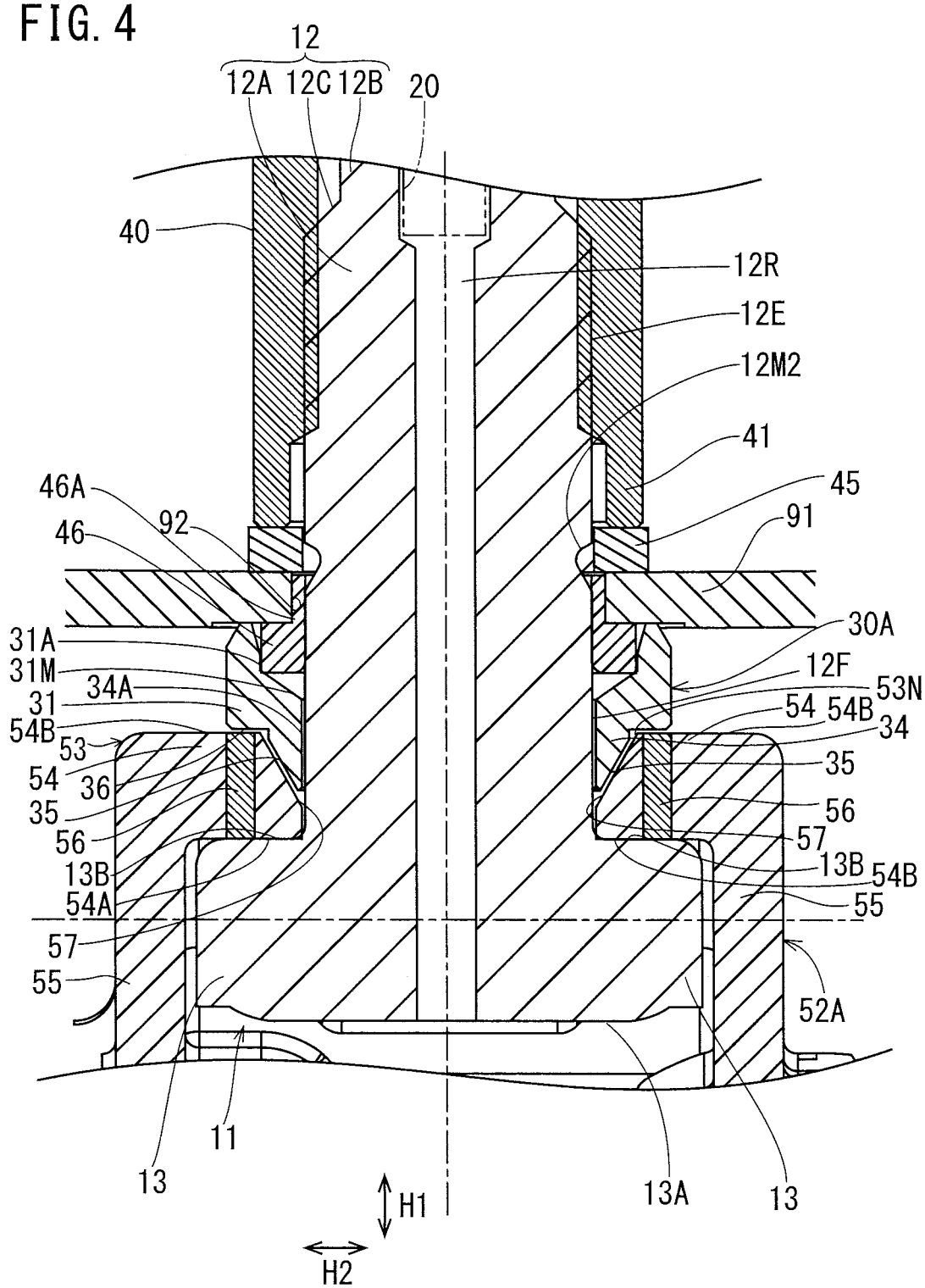
FIG. 4 is a cross-sectional side view of the tire valve in cross section A-A of FIG. 2.

When the nut 40 is not fastened on the threaded part 12E of the valve stem 11, the support ring 30A can rotate around the valve stem 11 relative to the electronic device 50. The position where the direction in which the pair of guide slopes 35 of the support ring 30A is aligned matches the direction in which the pair of arcuate grooves 54 of the electronic device 50 is aligned as shown in FIG. 4 is the normal rotational position where the support ring 30A and electronic device 50 are correctly positioned relative to each other. When the support ring 30A and electronic device 50 are in this normal rotational position and the support ring 30A is pressed in the first direction H1 toward the electronic device 50, the abutment surface 36 of the support ring 30A makes contact with the outer arcuate surfaces 54B of the pair of arcuate grooves 54, the small-diameter part 34 of the support ring 30A is received between the pair of arcuate grooves 54, and the pair of guide slopes 35 becomes adjacent to the pair of tapered guide surfaces 57 of the electronic device 50 with a slight gap therebetween. In this state, the pair of arcuate discs 56 embedded in the pair of arcuate grooves 54 is sandwiched between the pair of retaining parts 13 of the valve stem 11 and the support ring 30A.

The grommet 46, which is made of elastomer, is shown in FIG. 2 in a state before being compressed, and in FIG. 4 in a state of being compressed. The grommet 46 before being compressed has an inner face and an outer face with a uniform diameter as shown in FIG. 2, and a distal end face and a proximal end face that are perpendicular to the first direction H1, with an annular protrusion 46A protruding from an inner edge on the distal end face. The annular protrusion 46A is tapered on the outside. The grommet 46 is fitted into the large-diameter hole 31A of the support ring 30A, with the proximal end face abutted on the tapered surface 31M, and the distal end face positioned more forward than the support ring 30A.

The structure of the tire valve 10A according to this embodiment has been described above. This tire valve 10A is attached to the tire wheel 90 as described below. The tire valve 10A, with the nut 40 and washer 45 removed from the valve stem 11, is inserted into the valve mount hole 92 of the tire wheel 90 with no tire 93 attached thereto, from the inner side of the rim 91. The washer 45 and nut 40 are then mounted to the valve stem 11 protruding from the valve mount hole 92 to the outer side of the rim 91, and the nut 40 is fastened lightly (i.e., temporarily).

At this time, the annular protrusion 46A of the grommet 46 is received into the valve mount hole 92 from the inner side of the rim 91. One of the interference avoidance parts 33 of the support ring 30A is set adjacent to the notch 96 of the tire wheel 90. Further, the lower side of the electronic device 50 is set to face the tubular part 91B of the tire wheel 90. Since the electronic device 50 is tiltable around the retaining part 13 of the valve stem 11 at this stage, it is adjusted to take a prescribed normal tilted attitude. Specifically, in this embodiment, the lower side of the electronic device 50 is parallel to the rotation center of the tire wheel 90 in the normal tilted attitude, for example. The electronic device is adjusted to take such an attitude, after which the lower faces of the pair of L-shaped legs 51L are abutted on an outer circumferential surface of the tubular part 91B of the tire wheel 90.

When the nut 40 is fastened with a prescribed fastening torque (final fastening), the support ring 30A and the pair of arcuate grooves 54 of the electronic device 50 are sandwiched between the pair of retaining parts 13 of the valve stem 11 and the inner face of the rim 91, so that the electronic device 50 is fixed to a certain tilted attitude. The grommet 46 is compressed between the support ring 30A and the rim 91 to make tight contact with an inner surface of the valve mount hole 92, an opening edge of the rim 91, an outer surface of the fitting part 12F of the valve stem 11 as shown in FIG. 4, so that the valve mount hole 92 is sealed. The above procedure completes the mounting of the tire valve 10A.

When the tire valve 10A is passed through the valve mount hole 92, before the nut 40 is fastened, the support ring 30A is set to a certain rotational position relative to the valve mount hole 92 by the interference avoidance parts 33 and the notch 96 being adjacent to each other. In this state, however, a situation can arise where the electronic device 50 is displaced from the normal rotational position relative to the support ring 30A. When this is the case, according to the tire valve 10A of this embodiment, the electronic device 50 is guided to the normal rotational position relative to the support ring 30A in the process in which the nut 40 is fastened to the valve stem 11, causing the support ring 30A to approach the connection part 52A of the electronic device 50, and in which the pair of guide slopes 35 of the support ring 30A and the pair of tapered guide surfaces 57 of the electronic device 50 slide on each other, i.e., the displacement from the normal rotational position is automatically corrected. The tire valve 10A of this embodiment has such an automatic alignment function whereby the electronic device 50 is automatically guided to the normal rotational position in the process in which the tire valve 10A is attached to the tire wheel 90, so that the operation of attaching the tire valve 10A is made easier.

When the support ring 30A and electronic device 50 are largely displaced from each other more than a maximum tolerable misalignment angle (of, for example 30° in this embodiment), below which the support ring 30A and the electronic device 50 can be guided toward the normal rotational position, part of the support ring 30A without the guide slopes 35 abuts on the pair of tapered guide surfaces 57 of the electronic device 50 and prohibits the support ring 30A and electronic device 50 from approaching each other. This allows the operator to realize that the support ring 30A and electronic device 50 are largely displaced from the normal rotational position, and prevents a situation where the support ring 30A and electronic device 50 are left misaligned relative to each other.

Since the support ring 30A including the pair of interference avoidance parts 33 and the pair of guide slopes 35 has a rotation symmetry as a whole, it is easy to put the support ring 30A and electronic device 50 back to the normal rotational position by turning them in suitable directions relative to each other, when the support ring 30A and electronic device 50 are largely displaced from each other more than the maximum tolerable misalignment angle, below which the support ring 30A and the electronic device 50 can be guided to the normal rotational position. The rotation symmetry of the support ring 30A allows the electronic device 50 and support ring 30A to be readily set in the normal rotational position when assembling the support ring 30A by inserting the valve stem 11 into the ring, so that the operation of assembling the tire valve 10A is also made easier.

Since the electronic device 50 is tiltable around an axis perpendicular to the axial direction of the valve stem 11 (which is also the axial direction of the valve mount hole 92), the tire valve 10A can be fixed to various types of tire wheels 90 having a valve mount hole 92 in different positions such that the electronic device 50 does not interfere with an inner face of the tire wheel 90 by adjusting the tilted attitude of the electronic device as required.

Since the pair of metal arcuate discs 56 is embedded in the pair of arcuate grooves 54 of the resin-made housing 50H of the electronic device 50, the pair of metal arcuate discs 56 is held between the pair of retaining parts 13 of the valve stem 11 made of metal and the support ring 30A made of metal when the electronic device 50 is fixed in any desired tilted attitude, which provides a good balance in strength and allows the electronic device 50 to be stably fixed in the desired tilted position.

When the electronic device 50 is located at the normal rotational position relative to the support ring 30A, the pair of tapered guide surfaces 57 of the electronic device 50 and the pair of guide slopes 35 of the support ring 30A provided for the automatic alignment function described above face each other with a gap therebetween, which prevents a large force from being applied to the pair of guide slopes 35 and the pair of tapered guide surfaces 57 when the nut 40 is fastened.

Second Embodiment

Figure 8A:
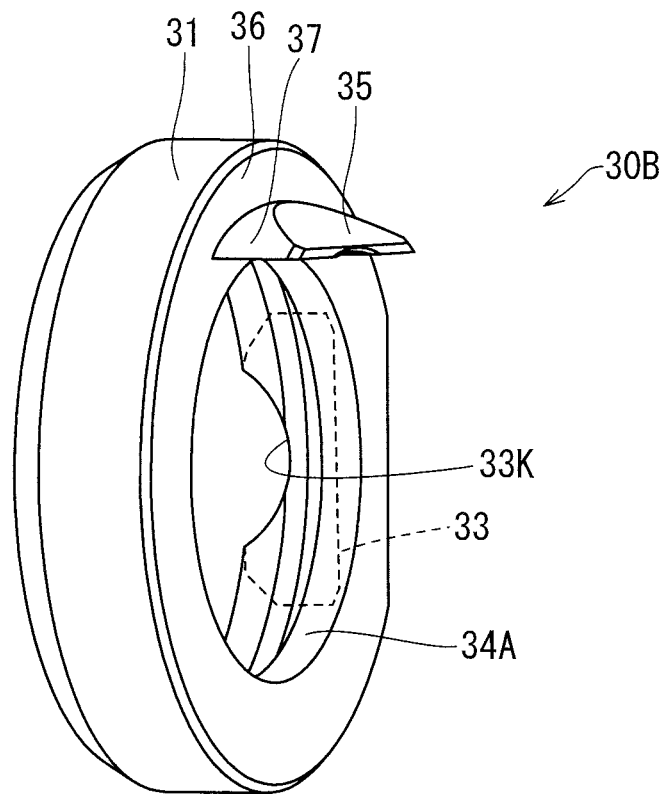
FIG. 8(A) is a perspective view and (B) is a cross-sectional side view of a support ring of a second embodiment.
Figure 8B:
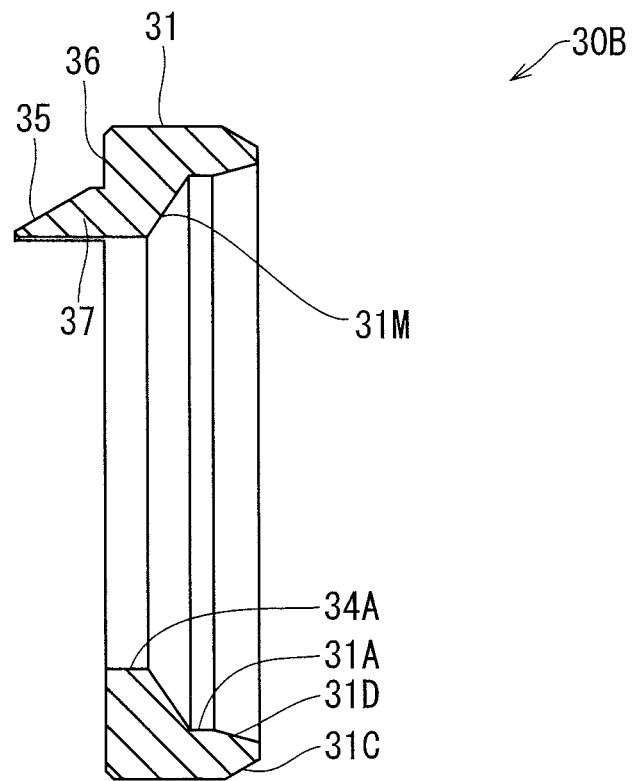

This embodiment is shown in FIG. 8 and has a support ring 30B with a different structure from that of the support ring 30A of the tire valve 10A of the first embodiment. Namely, the support ring 30A of the first embodiment has the small-diameter part 34 on the proximal end side of the abutment surface 36 as shown in FIG. 7, with the pair of guide slopes 35 formed on this small-diameter part 34. The support ring 30B of this embodiment does not have a small-diameter part 34 as shown in FIG. 8 and instead, a lug 37 extends out from part of the opening edge of the abutment surface 36, with one guide slope 35 formed on this lug 37. The interference avoidance part 33 is provided only at one location 90° away from the guide slope 35. Other configurations are the same as those of the first embodiment.

This support ring 30B used for the tire valve 10A of the first embodiment can also provide the automatic alignment function described in the first embodiment and makes the operation of attaching the tire valve 10A to the tire wheel 90 easier. The connection part 52A of the electronic device 50 may be configured such that the tapered guide surface 57 is not formed to the arcuate groove 54 on the opposite side to the arcuate groove 54 having the tapered guide surface 57 that will abut the guide slope 35 of the support ring 30B in the normal rotational position, so that the lug 37 will interfere with the arcuate groove 54 when the electronic device 50 is 180° out of alignment from the normal rotational position relative to the support ring 30B.

Third Embodiment

Figure 9:
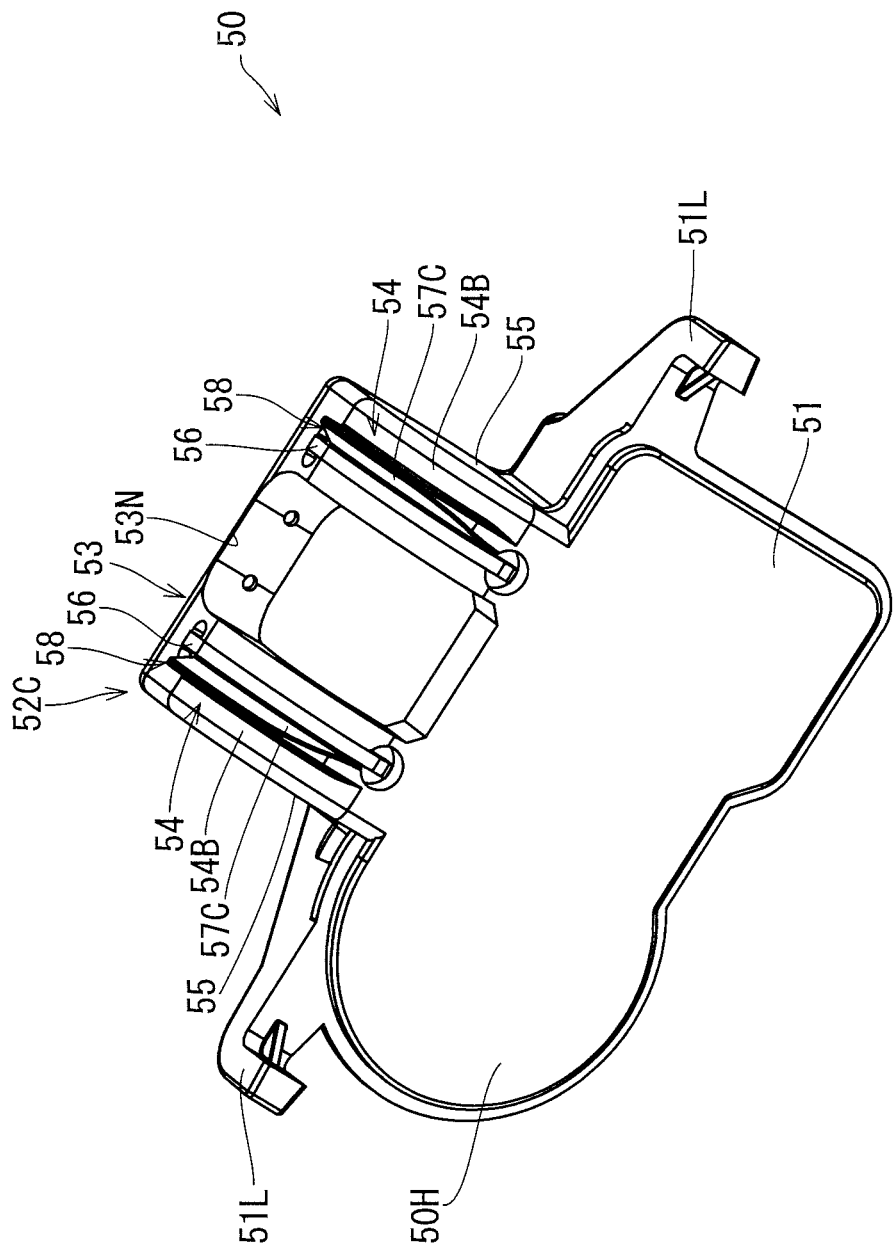
FIG. 9 is a perspective view of an electronic device of a tire valve according to a third embodiment seen from below.
Figure 10:
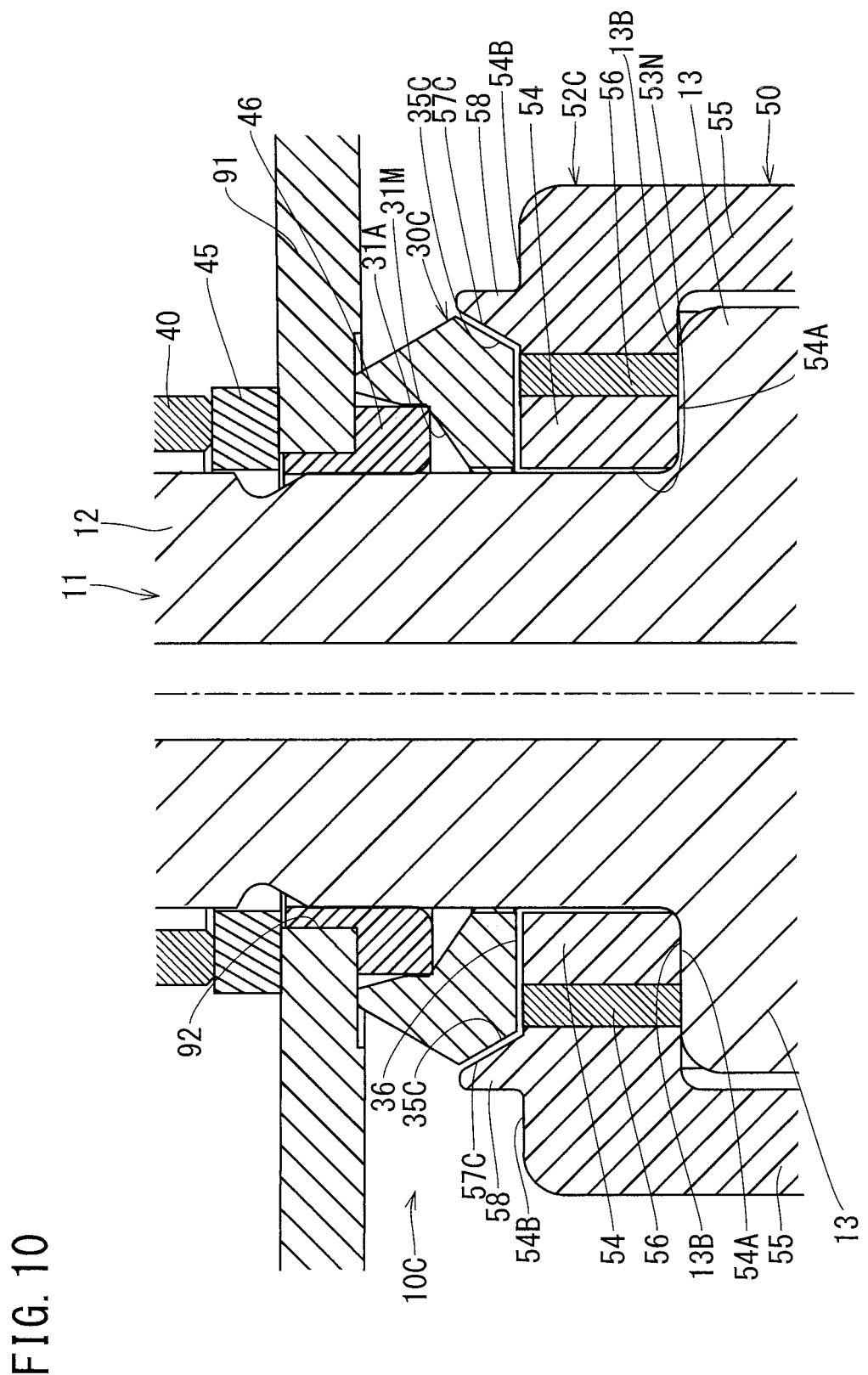
FIG. 10 is a cross-sectional side view of the tire valve.
Figure 11A:
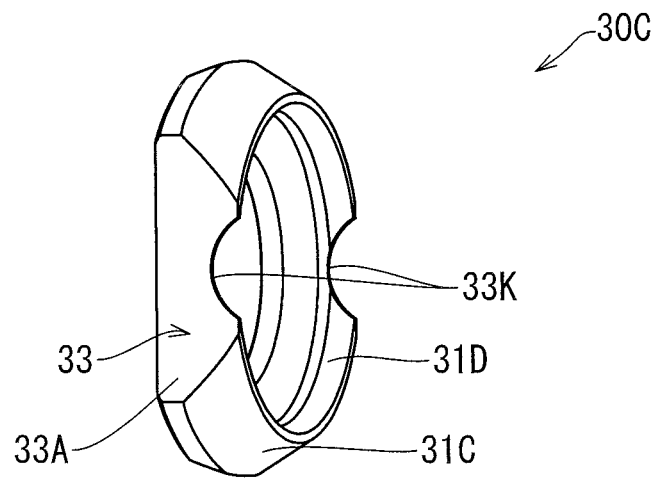
FIG. 11(A) is a perspective view of a support ring seen from a distal side, (B) is a perspective view of the support ring seen from a proximal side, and (C) is a cross-sectional side view of the support ring.
Figure 11B:
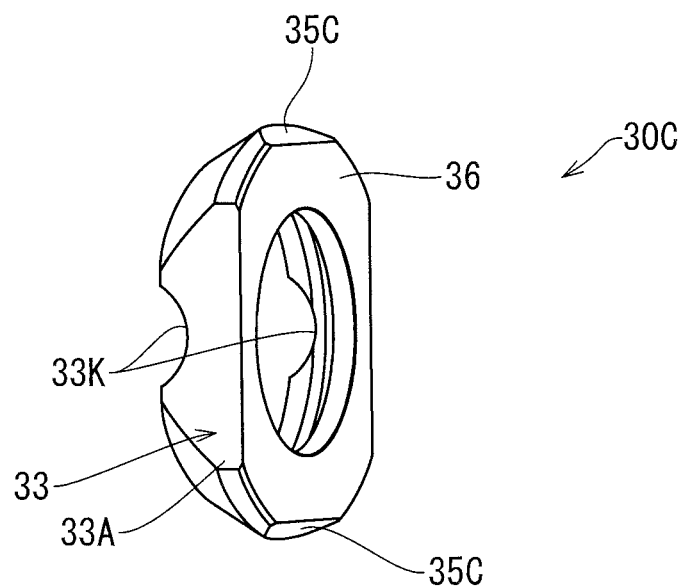
Figure 11C:
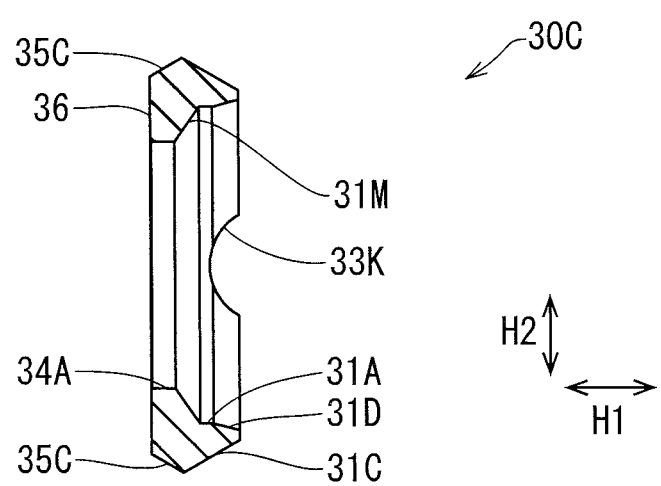

This embodiment is shown in FIG. 9 to FIG. 11 and different from the first embodiment in the configurations of a connection part 52C of the electronic device 50 and a support ring 30C. Namely, as shown in FIG. 9, the connection part 52C of this embodiment has a pair of arcuate ribs 58 protruding from the outer arcuate surface 54B of the pair of arcuate grooves 54. The pair of arcuate ribs 58 extends along the circumferential direction of the outer arcuate surface 54B from the lower end to the upper end of the arcuate grooves 54. The pair of arcuate ribs 58 is located farther from the slot 53N than the parts of the pair of arcuate grooves 54 where the pair of arcuate discs 56 is embedded. As shown in FIG. 10, the opposing surfaces of the pair of arcuate ribs 58 form a pair of tapered guide surfaces 57C. This connection part 52C is not formed with the chamfered surface 53M (see FIG. 5(B)), part of which is the pair of tapered guide surfaces 57 described in the first embodiment along the opening edge of the slot 53N.

Corresponding to the connection part 52C described above, the support ring 30C of a tire valve 10C in this embodiment does not have the small-diameter part 34 on the proximal side of the abutment surface 36, the abutment surface 36 itself being the proximal end face, as shown in FIG. 11. The support ring 30C is formed with a pair of guide slopes 35C at two locations each 90° away from each of the pair of interference avoidance parts 33 so that the support ring as a whole has a rotation symmetry. Moreover, the pair of guide slopes 35C is positioned at the proximal end on the outer circumferential surface of the support ring 30C and inclined to the axial direction of the support ring 30C at the same angle as the angle of inclination of the pair of tapered guide surfaces 57C relative to the radial direction of the outer arcuate surface 54B. When the electronic device 50 is set in the normal rotational position relative to the support ring 30C, the abutment surface 36 makes contact with a portion of the outer arcuate surface 54B of the pair of arcuate grooves 54 between the pair of arcuate ribs 58, and the pair of tapered guide surfaces 57C becomes adjacent to the pair of guide slopes 35C.

The tire valve 10C of this embodiment also provides the automatic alignment function described in the first embodiment and makes the operation of attaching the tire valve 10C to the tire wheel 90 easier.

Fourth Embodiment

Figure 12A:
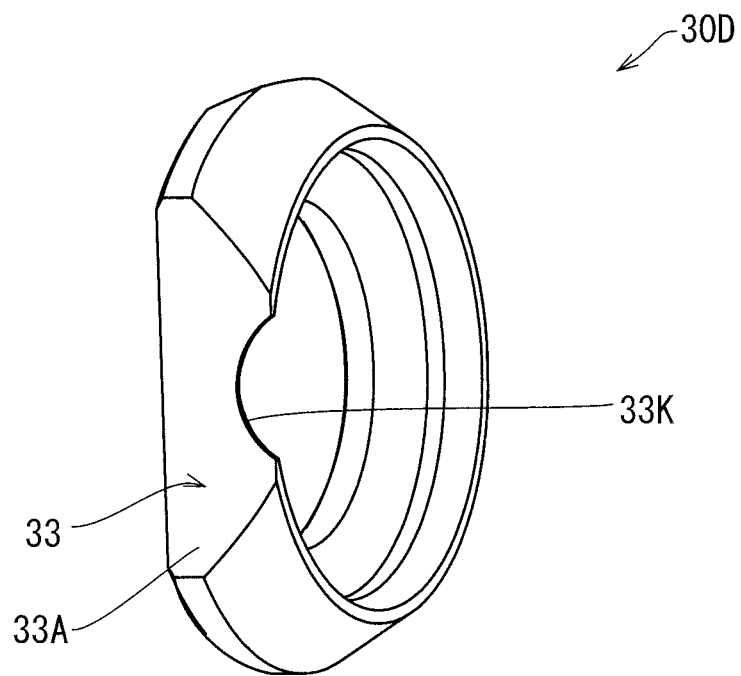
FIG. 12(A) is a perspective view of a support ring according to a fourth embodiment seen from a distal side, and (B) is a perspective view of the support ring seen from a proximal side.
Figure 12B:
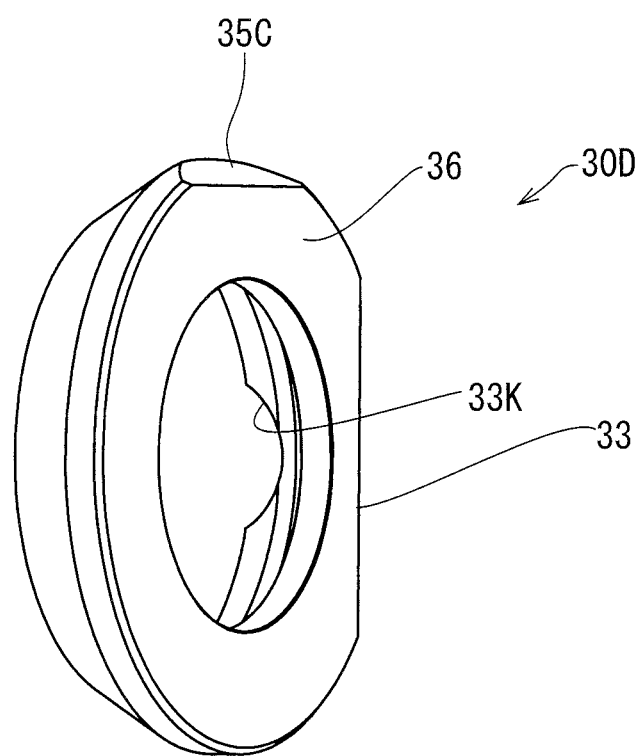

This embodiment is shown in FIG. 12 and includes a support ring 30D configured without one of the interference avoidance parts 33 and one of the guide slopes 35C of the support ring 30C in the tire valve 10C of the third embodiment. Other configurations are the same as those of the third embodiment. The configuration of this embodiment also provides the automatic alignment function described in the first embodiment similarly to the second embodiment.

Fifth Embodiment

Figure 13:
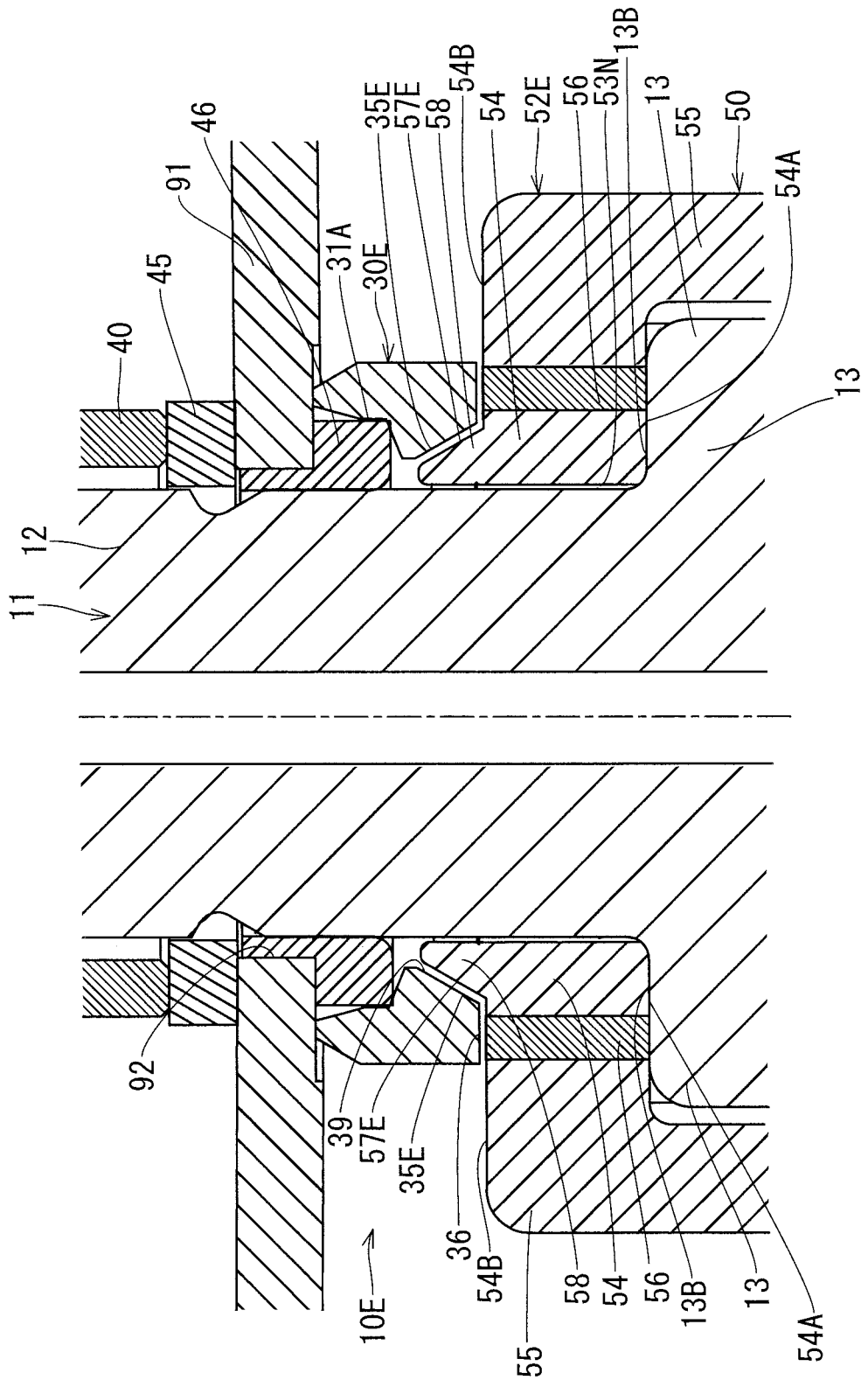
FIG. 13 is a cross-sectional side view of a tire valve according to a fifth embodiment.

A tire valve 10E of this embodiment is shown in FIG. 13 and different from the third embodiment in the configurations of a connection part 52E of the electronic device 50 and a support ring 30E. Namely, the connection part 52E of this embodiment has the pair of arcuate ribs 58 located closer to the slot 53N than the parts of the pair of arcuate grooves 54 where the pair of arcuate discs 56 is embedded, and has the pair of tapered guide surfaces 57E on the opposite side to the opposing surfaces of the pair of arcuate ribs 58.

The support ring 30E on the other hand has grooves 39 at the proximal end, extending in a direction in which the pair of interference avoidance parts 33 (not shown) is aligned (direction perpendicular to the paper surface of FIG. 13). A pair of inner side faces of the grooves 39 forms a pair of guide slopes 35E inclined to the axial direction of the support ring 30E. When the electronic device 50 is set in the normal rotational position relative to the support ring 30E, the abutment surface 36 makes contact with the outer arcuate surface 54B of the pair of arcuate grooves 54, and the pair of tapered guide surfaces 57E becomes adjacent to the pair of guide slopes 35E. Thus, the tire valve 10E of this embodiment also provides the automatic alignment function described in the first embodiment.

Sixth Embodiment

Figure 14:
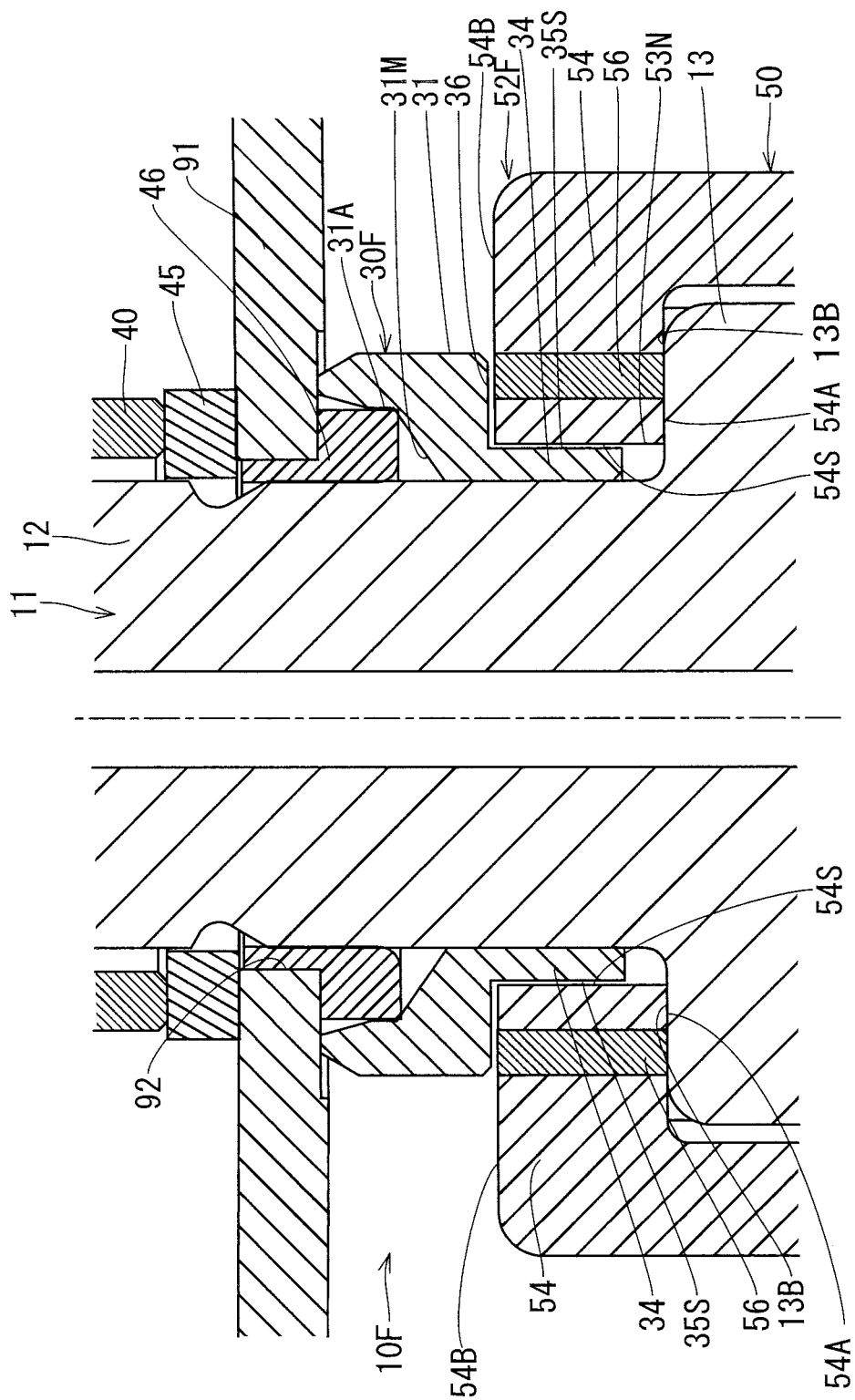
FIG. 14 is a cross-sectional side view of a tire valve according to a sixth embodiment.
Figure 15:
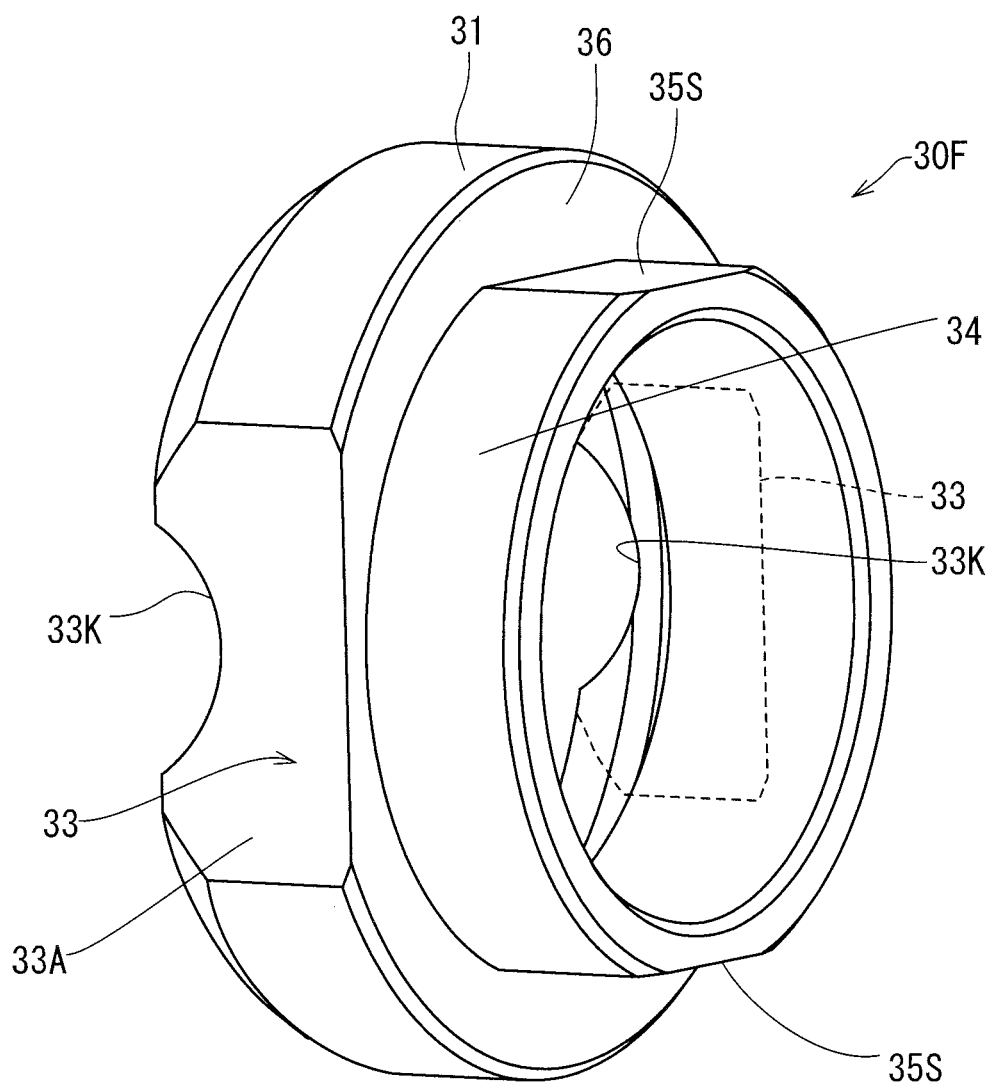
FIG. 15 is a perspective view of a support ring.

A tire valve 10F of this embodiment is shown in FIG. 14 and FIG. 15. As shown in FIG. 15, a support ring 30F of the tire valve 10F of this embodiment has a pair of rotation restricting walls 35S that is parallel to the axial direction and flat, instead of the pair of guide slopes 35 on the small-diameter part 34 of the support ring 30A of the first embodiment. Correspondingly, a connection part 52F is not formed with the chamfered surface 53M (see FIG. 5(B)), part of which is the pair of tapered guide surfaces 57, along the opening edge of the slot 53N.

As shown in FIG. 14, when the electronic device 50 is set in the normal rotational position relative to the support ring 30F, the abutment surface 36 makes contact with the outer arcuate surface 54B of the pair of arcuate grooves 54, and a pair of rotation restricting walls 35S becomes adjacent to opposing surfaces 54S of the pair of arcuate grooves 54. While the tire valve 10F of this embodiment does not provide the automatic alignment function described in the first embodiment, the rotation restricting walls 35S facing the opposing surfaces 54S restrict the rotation of the electronic device 50 relative to the support ring 30F and keeps the electronic device 50 stably in the normal rotational position.

Seventh Embodiment

Figure 16:
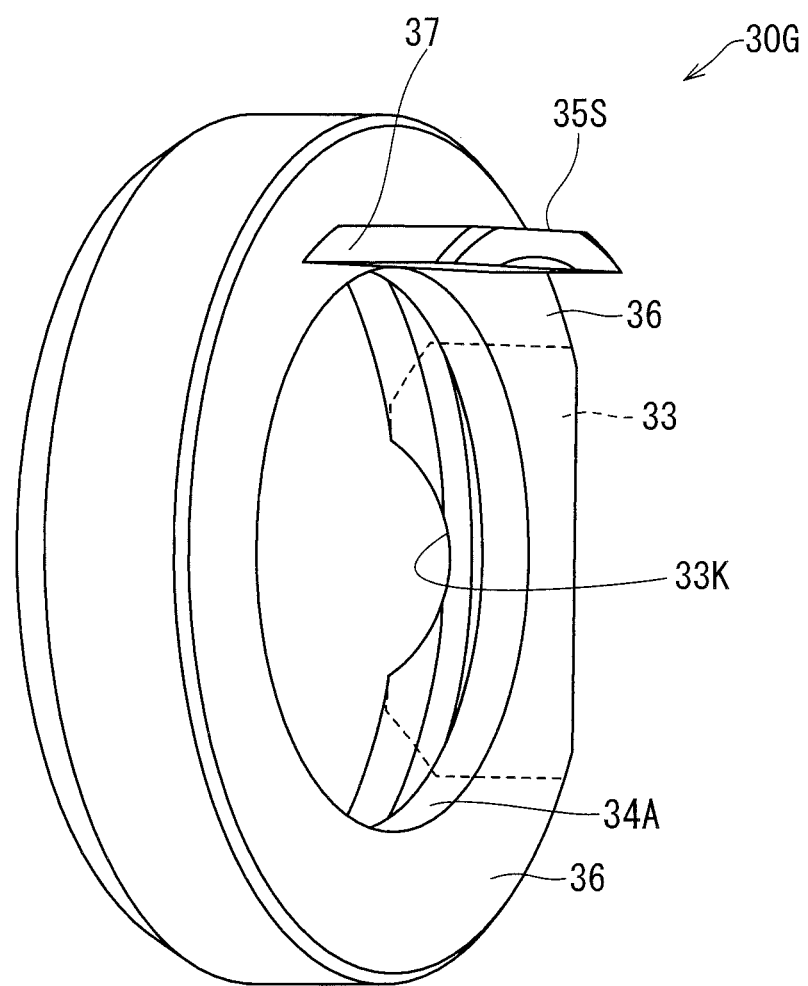
FIG. 16 is a perspective view of a support ring according to a seventh embodiment.

This embodiment is shown in FIG. 16. Similarly to the relationship between the first embodiment and the second embodiment, the lug 37 protrudes from the abutment surface 36, with the rotation restricting wall 35S formed on this lug 37, in exchange for elimination of the small-diameter part 34 from the support ring 30F of the sixth embodiment, and a support ring 30G is configured without one of the interference avoidance parts 33. This configuration also provides similar effects as those of the sixth embodiment.

Eighth Embodiment

Figure 17:
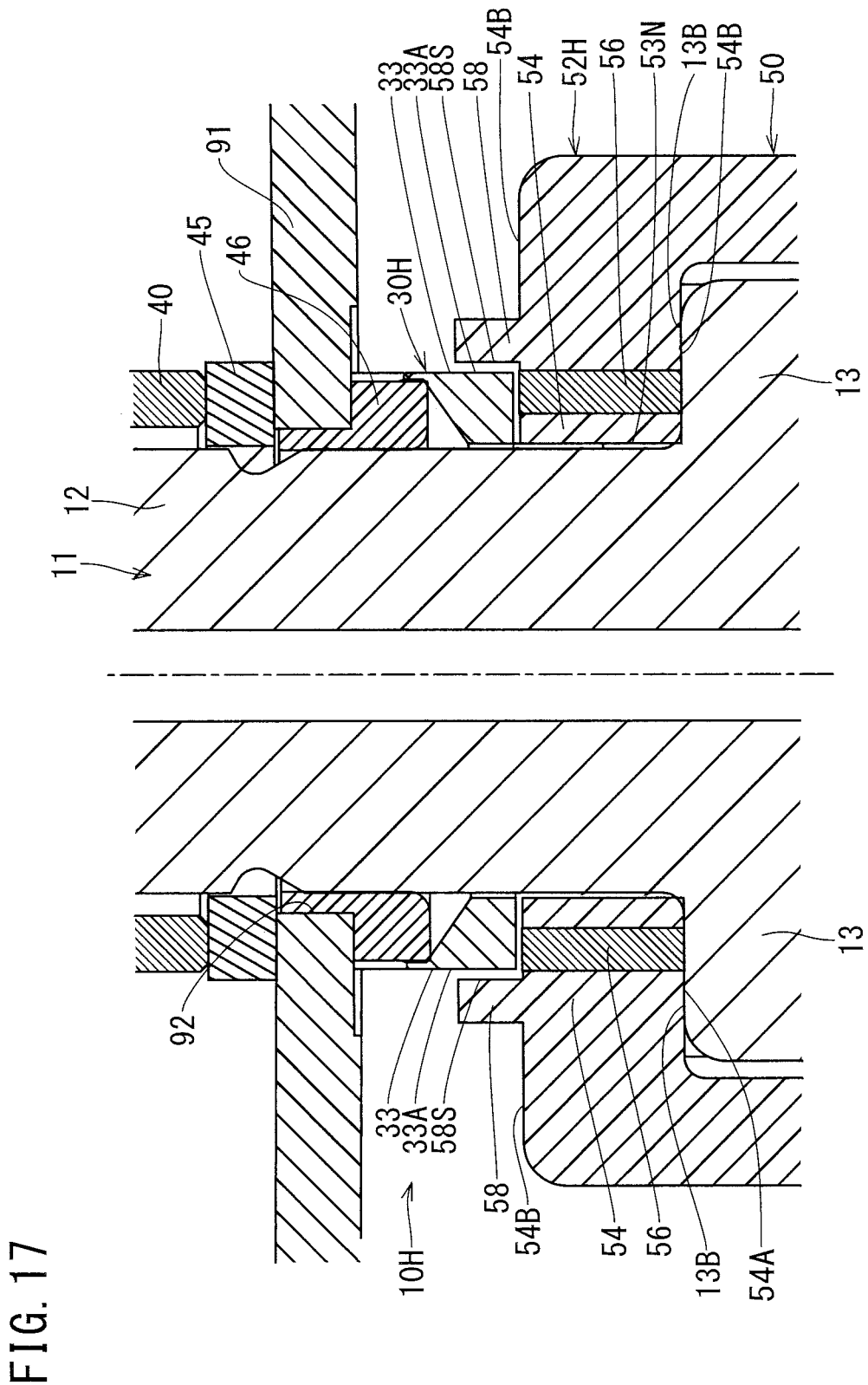
FIG. 17 is a cross-sectional side view of a tire valve according to an eighth embodiment.
Figure 18A:
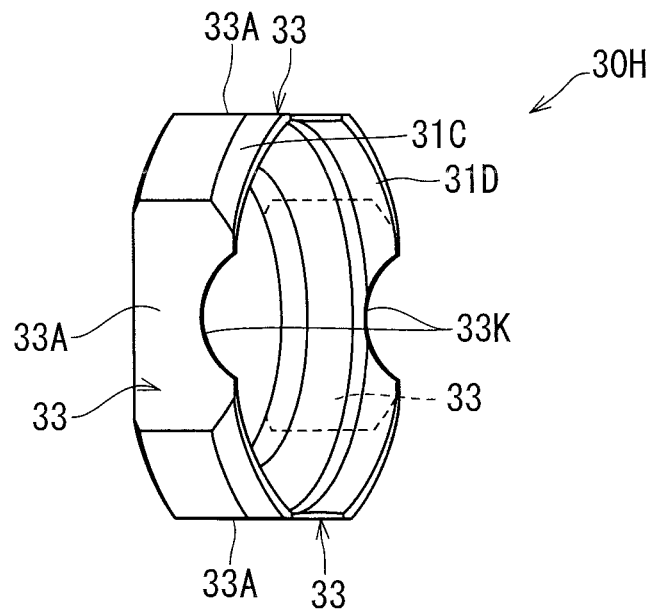
FIG. 18(A) is a perspective view of a support ring seen from a distal side, (B) is a perspective view of the support ring seen from a proximal side, and (C) is a cross-sectional side view of the support ring.
Figure 18B:
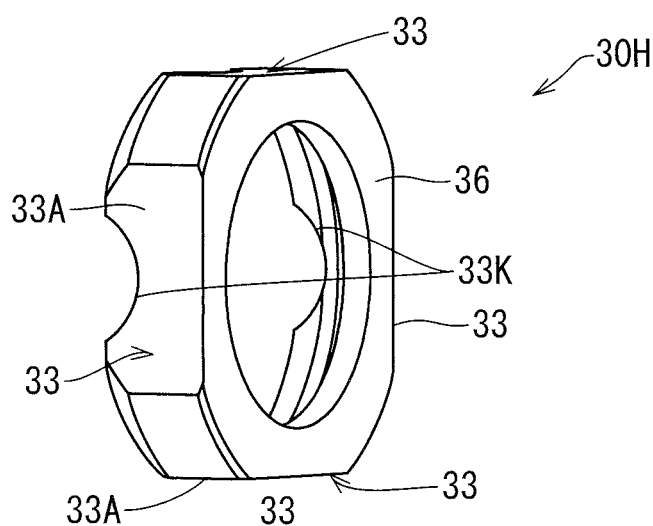
Figure 18C:
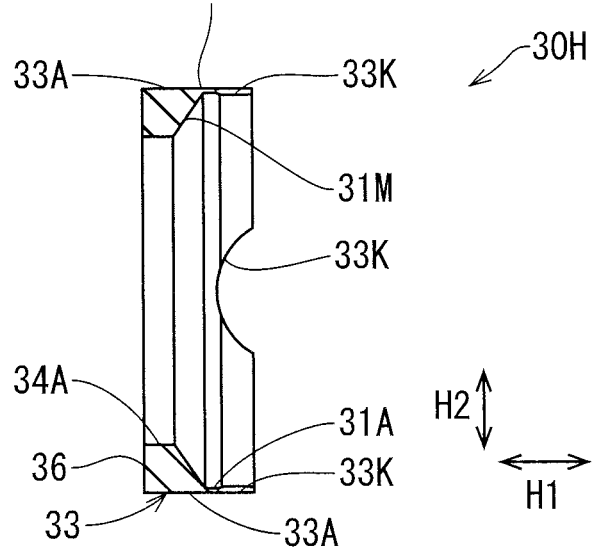

A tire valve 10H of this embodiment is shown in FIG. 17 and FIG. 18. As shown in FIG. 17, a connection part 52H of the electronic device 50 in the tire valve 10H of this embodiment is configured such that the opposing surfaces of the pair of arcuate ribs 58 in the connection part 52C of the third embodiment are changed to a pair of rotation restricting walls 58S that is parallel to each other and flat. A support ring 30H on the other hand does not have the small-diameter part 34 described above as shown in FIG. 18, the abutment surface 36 itself being the proximal end face, and instead is formed with interference avoidance parts 33 at four equally spaced locations on the outer circumferential surface. One of the interference avoidance parts 33 is set to face the notch 96 (see FIG. 2) of the tire wheel 90, and the flat surfaces 33A of the pair of interference avoidance parts 33 on both sides of that interference avoidance part 33 are set adjacent to the rotation restricting walls 58S of the pair of arcuate ribs 58 as shown in FIG. 17. Similarly to the sixth embodiment, the configuration of this embodiment also restricts the rotation of the electronic device 50 relative to the support ring 30H and provides the effect of keeping the electronic device 50 stably in the normal rotational position.

Ninth Embodiment

Figure 19:
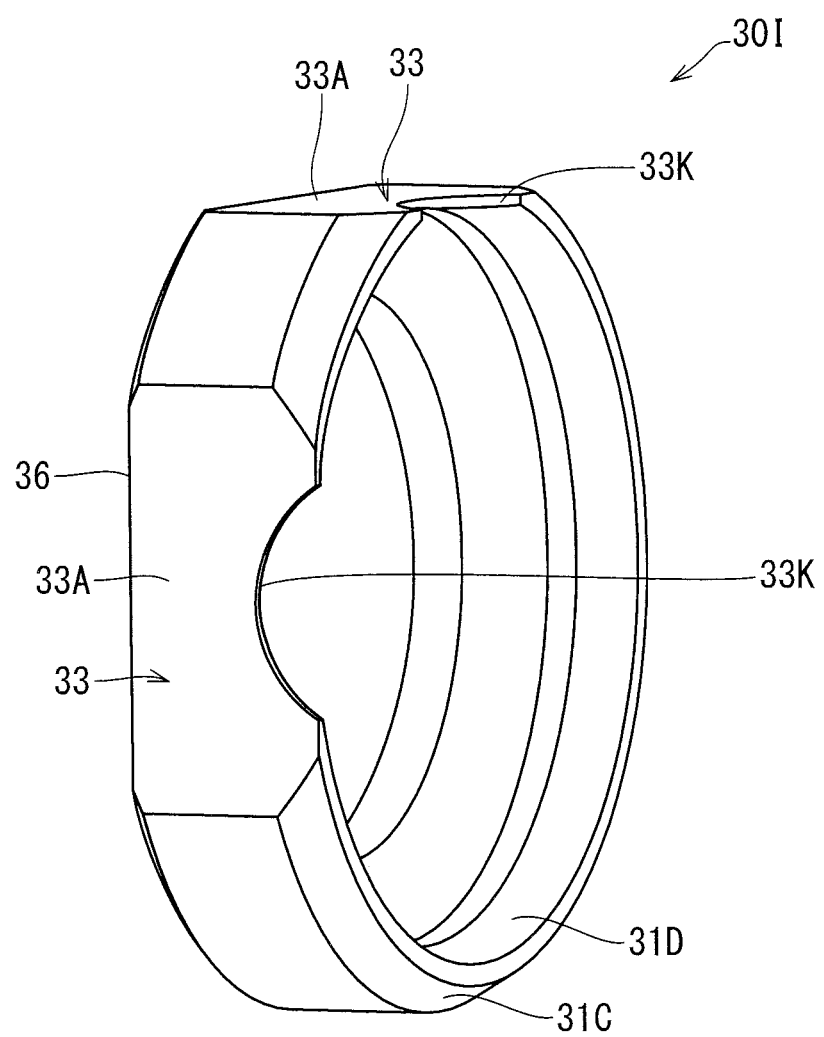
FIG. 19 is a perspective view of a support ring according to a ninth embodiment.

This embodiment is shown in FIG. 19. Similarly to the relationship between the third embodiment and the fourth embodiment, a support ring 30I is configured such that two adjacent interference avoidance parts 33 are removed from the support ring 30H of the eighth embodiment. This configuration also provides similar effects as those of the eighth embodiment.

[Notes]

While specific examples of the techniques included in the claims are disclosed in the specification and drawings, the techniques set forth in the claims are not limited to these specific examples but rather include various modifications and alterations of the specific examples, as well as partial extracts from the specific examples.

DESCRIPTION OF THE REFERENCE NUMERAL 10A, 10C, 10E, 10F, 10H Tire valve
11 Valve stem
13 Retaining part
30A to 30I Support ring
33 Interference avoidance part
34A Small-diameter hole
35, 35C, 35E Guide slope (guide part)
40 Nut
50 Electronic device
52A, 52C, 52E, 52F, 52H Connection part
53 Curved wall
54 Arcuate groove
56 Arcuate disc
57, 57C, 57E Tapered guide surface (guide part)
90 Tire wheel
91 Rim
92 Valve mount hole
96 Notch (wheel wall portion)
H1 First direction
H2 Second direction

The invention claimed is:

1. A tire valve comprising:
a valve stem passed through a valve mount hole extending through a rim of a tire wheel from an inner side of the rim, and screwed with a nut on an outer side of the rim;
a retaining part extending sideways from a proximal end of the valve stem;
an electronic device having a connection part that fits onto an outer side of the retaining part;
a support ring set on the valve stem, the support ring and a portion of the connection part being sandwiched between the retaining part and an opening edge of the valve mount hole by fastening the nut;
an interference avoidance part formed by cutting off part of an outer circumferential surface of the support ring and positioned adjacent to a wheel wall portion of the tire wheel near the valve mount hole; and
guide parts provided to the support ring and the electronic device, wherein the guide parts slide on each other by fastening the nut thereby causing the support ring and the electronic device to approach, to guide the support ring and the electronic device toward a normal rotational position where the support ring and the electronic device are at correct rotational positions relative to each other around the valve stem, when the support ring and the electronic device are displaced from the normal rotational position.

2. The tire valve according to claim 1, wherein the guide part of one of the support ring and the electronic device interferes with a portion other than the guide part of an other one of the support ring and the electronic device to prohibit the support ring and the electronic device from approaching each other when the support ring and the electronic device are displaced from each other more than a maximum tolerable misalignment angle, below which the guide parts of the support ring and the electronic device are capable of guiding the support ring and the electronic device toward the normal rotational position by sliding on each other.

3. The tire valve according to claim 2, wherein the interference avoidance part is formed at two locations spaced apart by 180° on an outer circumferential surface of the support ring,
the interference avoidance parts and the guide parts being formed in rotation symmetry to the support ring.

4. The tire valve according to claim 2, wherein the retaining part extends to both sides of the proximal end of the valve stem in a second direction perpendicular to a first direction that is an axial direction of the valve stem, and
the connection part includes a pair of arcuate grooves that rotatably fits onto the retaining part on both sides of the valve stem,
the pair of arcuate grooves being sandwiched in the first direction between the retaining part and the support ring by fastening the nut so as to be stopped from rotating.

5. The tire valve according to claim 4, wherein the valve stem and the support ring are made of metal while the pair of arcuate grooves is made of resin, and
a pair of metal arcuate discs is embedded in a portion of the pair of arcuate grooves sandwiched between the support ring and the retaining part, arcuate inner side faces and outer side faces of the pair of arcuate discs being exposed on arcuate inner side faces and outer side faces of the pair of arcuate grooves.

6. The tire valve according to claim 5, wherein the guide part of the electronic device includes a tapered surface formed on surfaces of the pair of arcuate grooves facing each other and sloped toward the valve stem in a direction toward the retaining part, and the guide part of the support ring includes a tubular protrusion received between the pair of arcuate grooves, and a pair of guide slopes formed at two 180° spaced apart locations on the tubular protrusion and sloped toward each other in a direction toward the retaining part, the guide slopes being parallel to a third direction perpendicular to the first direction and the second direction, the pair of guide slopes and the tapered surfaces being adjacent to or abutting each other when viewed from the third direction, when the support ring and the electronic device are set in the normal rotational position.

7. The tire valve according to claim 6 wherein a gap is formed between the pair of guide slopes and the pair of tapered surfaces when viewed from the third direction, when the support ring and the electronic device are set in the normal rotational position.

8. The tire valve according to claim 4, wherein the guide part of the electronic device includes a tapered surface formed on surfaces of the pair of arcuate grooves facing each other and sloped toward the valve stem in a direction toward the retaining part, and the guide part of the support ring includes a tubular protrusion received between the pair of arcuate grooves, and a pair of guide slopes formed at two 180° spaced apart locations on the tubular protrusion and sloped toward each other in a direction toward the retaining part, the guide slopes being parallel to a third direction perpendicular to the first direction and the second direction, the pair of guide slopes and the tapered surfaces being adjacent to or abutting each other when viewed from the third direction, when the support ring and the electronic device are set in the normal rotational position.

9. The tire valve according to claim 8, wherein a gap is formed between the pair of guide slopes and the pair of tapered surfaces when viewed from the third direction, when the support ring and the electronic device are set in the normal rotational position.

10. The tire valve according to claim 1, wherein the interference avoidance part is formed at two locations spaced apart by 180° on an outer circumferential surface of the support ring, the interference avoidance parts and the guide parts being formed in rotation symmetry to the support ring.

11. The tire valve according to claim 10, wherein the retaining part extends to both sides of the proximal end of the valve stem in a second direction perpendicular to a first direction that is an axial direction of the valve stem, and the connection part includes a pair of arcuate grooves that rotatably fits onto the retaining part on both sides of the valve stem, the pair of arcuate grooves being sandwiched in the first direction between the retaining part and the support ring by fastening the nut so as to be stopped from rotating.

12. The tire valve according to claim 11, wherein the valve stem and the support ring are made of metal while the pair of arcuate grooves is made of resin, and a pair of metal arcuate discs is embedded in a portion of the pair of arcuate grooves sandwiched between the support ring and the retaining part, arcuate inner side faces and outer side faces of the pair of arcuate discs being exposed on arcuate inner side faces and outer side faces of the pair of arcuate grooves.

13. The tire valve according to claim 11, wherein the guide part of the electronic device includes a tapered surface formed on surfaces of the pair of arcuate grooves facing each other and sloped toward the valve stem in a direction toward the retaining part, and the guide part of the support ring includes a tubular protrusion received between the pair of arcuate grooves, and a pair of guide slopes formed at two 180° spaced apart locations on the tubular protrusion and sloped toward each other in a direction toward the retaining part, the guide slopes being parallel to a third direction perpendicular to the first direction and the second direction, the pair of guide slopes and the tapered surfaces being adjacent to or abutting each other when viewed from the third direction, when the support ring and the electronic device are set in the normal rotational position.

14. The tire valve according to claim 13, wherein a gap is formed between the pair of guide slopes and the pair of tapered surfaces when viewed from the third direction, when the support ring and the electronic device are set in the normal rotational position.

15. The tire valve according to claim 1, wherein the retaining part extends to both sides of the proximal end of the valve stem in a second direction perpendicular to a first direction that is an axial direction of the valve stem, and the connection part includes a pair of arcuate grooves that rotatably fits onto the retaining part on both sides of the valve stem, the pair of arcuate grooves being sandwiched in the first direction between the retaining part and the support ring by fastening the nut so as to be stopped from rotating.

16. The tire valve according to claim 15, wherein the valve stem and the support ring are made of metal while the pair of arcuate grooves is made of resin, and a pair of metal arcuate discs is embedded in a portion of the pair of arcuate grooves sandwiched between the support ring and the retaining part, arcuate inner side faces and outer side faces of the pair of arcuate discs being exposed on arcuate inner side faces and outer side faces of the pair of arcuate grooves.

17. The tire valve according to claim 16, wherein the guide part of the electronic device includes a tapered surface formed on surfaces of the pair of arcuate grooves facing each other and sloped toward the valve stem in a direction toward the retaining part, and the guide part of the support ring includes a tubular protrusion received between the pair of arcuate grooves, and a pair of guide slopes formed at two 180° spaced apart locations on the tubular protrusion and sloped toward each other in a direction toward the retaining part, the guide slopes being parallel to a third direction perpendicular to the first direction and the second direction, the pair of guide slopes and the tapered surfaces being adjacent to or abutting each other when viewed from the third direction, when the support ring and the electronic device are set in the normal rotational position.

18. The tire valve according to claim 17, wherein a gap is formed between the pair of guide slopes and the pair of tapered surfaces when viewed from the third direction, when the support ring and the electronic device are set in the normal rotational position.

19. The tire valve according to claim 15, wherein the guide part of the electronic device includes a tapered surface formed on surfaces of the pair of arcuate grooves facing each other and sloped toward the valve stem in a direction toward the retaining part, and the guide part of the support ring includes a tubular protrusion received between the pair of arcuate grooves, and a pair of guide slopes formed at two 180° spaced apart locations on the tubular protrusion and sloped toward each other in a direction toward the retaining part, the guide slopes being parallel to a third direction perpendicular to the first direction and the second direction, the pair of guide slopes and the tapered surfaces being adjacent to or abutting each other when viewed from the third direction, when the support ring and the electronic device are set in the normal rotational position.

20. The tire valve according to claim 19, wherein a gap is formed between the pair of guide slopes and the pair of tapered surfaces when viewed from the third direction, when the support ring and the electronic device are set in the normal rotational position.

* * * * *